US012413932B2

(12) United States Patent
Gummadi et al.

(10) Patent No.: US 12,413,932 B2
(45) Date of Patent: Sep. 9, 2025

(54) UE POSITIONING IN THE PRESENCE OF AN INTELLIGENT REFLECTING SURFACE (IRS)

(71) Applicant: QUALCOMM Incorporated, San Diego, CA (US)

(72) Inventors: Bapineedu Chowdary Gummadi, Hyderabad (IN); Stephen William Edge, Escondido, CA (US); Binil Francis Joseph, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 17/657,526

(22) Filed: Mar. 31, 2022

(65) Prior Publication Data
US 2023/0319507 A1    Oct. 5, 2023

(51) Int. Cl.
*H04W 4/029* (2018.01)
*H04L 5/00* (2006.01)

(52) U.S. Cl.
CPC ........... *H04W 4/029* (2018.02); *H04L 5/0048* (2013.01)

(58) Field of Classification Search
CPC .... G01S 5/0009; G01S 5/0218; G01S 5/0236; G01S 2205/008; H04B 7/04013; H04L 5/0048; H04W 4/029; H04W 64/00
See application file for complete search history.

(56) References Cited

U.S. PATENT DOCUMENTS

| | | | | |
|---|---|---|---|---|
| 9,641,984 B2 * | 5/2017 | Edge | ..................... | H04W 4/025 |
| 9,763,050 B2 * | 9/2017 | Belghoul | ................ | H04W 4/02 |
| 9,797,983 B1 * | 10/2017 | Bitra | ..................... | H04W 4/023 |
| 10,098,088 B1 * | 10/2018 | Kumar | ................ | H04W 64/006 |
| 10,736,074 B2 * | 8/2020 | Edge | ..................... | H04B 7/0897 |
| 11,006,383 B2 * | 5/2021 | Trichopoulos | ............ | G01S 5/14 |
| 11,187,773 B2 * | 11/2021 | Rydén | ................... | G01S 5/0236 |
| 11,330,550 B2 * | 5/2022 | Akkarakaran | ........ | G01S 13/765 |
| 11,496,990 B2 * | 11/2022 | Edge | ..................... | H04W 4/029 |

(Continued)

FOREIGN PATENT DOCUMENTS

| | | | | |
|---|---|---|---|---|
| CN | | 112346009 | 2/2021 | |
| WO | WO-2023217105 A1 * | | 11/2023 | ............. H04B 7/145 |
| WO | WO-2024077596 A1 * | | 4/2024 | |

OTHER PUBLICATIONS

International Search Report and Written Opinion—PCT/US2023/014188—ISA/EPO—Jun. 23, 2023.

(Continued)

*Primary Examiner* — Eric Nowlin
(74) *Attorney, Agent, or Firm* — QUALCOMM Incorporated

(57) ABSTRACT

According to embodiments, an example method of positioning a user equipment (UE) by a location server in a wireless communications network, the method may comprises receiving a request to perform positioning of the UE and receiving a notification from a first base station indicating that a transmission path between the first base station and the UE is via an intelligent reflecting surface (IRS). The method may further comprise responsive, at least in part, to receiving the notification, preventing the positioning of the UE from being based on a reference signal transmitted through the transmission path between the first base station and the UE.

26 Claims, 12 Drawing Sheets

(56) References Cited

U.S. PATENT DOCUMENTS

| | | | |
|---|---|---|---|
| 11,689,892 B2* | 6/2023 | Choi | H04W 4/025 |
| | | | 455/456.1 |
| 11,852,739 B2* | 12/2023 | Ryden | G01S 5/0236 |
| 2003/0157943 A1* | 8/2003 | Sabat, Jr. | H04W 64/00 |
| | | | 455/7 |
| 2010/0323720 A1* | 12/2010 | Jen | H04W 64/00 |
| | | | 455/456.1 |
| 2011/0143770 A1* | 6/2011 | Charbit | G01S 5/10 |
| | | | 455/456.1 |
| 2014/0176366 A1* | 6/2014 | Fischer | G01S 5/10 |
| | | | 342/374 |
| 2016/0054440 A1* | 2/2016 | Younis | G01S 13/867 |
| | | | 342/55 |
| 2016/0234644 A1* | 8/2016 | Belghoul | G01S 5/0236 |
| 2016/0360370 A1* | 12/2016 | Edge | H04W 64/00 |
| 2017/0082729 A1* | 3/2017 | Bar-Shalom | G01S 5/12 |
| 2018/0115439 A1* | 4/2018 | Bhatti | H04L 25/0204 |
| 2018/0295581 A1* | 10/2018 | Krishnamoorthy | |
| | | | H04W 52/0241 |
| 2018/0313929 A1* | 11/2018 | Bitra | G01S 5/021 |
| 2019/0037529 A1* | 1/2019 | Edge | G01S 1/0428 |
| 2019/0285721 A1* | 9/2019 | Xiong | G01S 5/10 |
| 2020/0163040 A1* | 5/2020 | Trichopoulos | G01S 5/0273 |
| 2020/0178202 A1* | 6/2020 | Edge | H04W 24/10 |
| 2020/0217918 A1* | 7/2020 | Rydén | H04W 4/029 |
| 2020/0296680 A1 | 9/2020 | Akkarakaran et al. | |
| 2021/0149009 A1* | 5/2021 | Modarres Razavi | H04W 64/00 |
| 2022/0014877 A1* | 1/2022 | Stare | G01S 5/0236 |
| 2022/0050164 A1* | 2/2022 | Ryden | G01S 5/0218 |
| 2022/0069958 A1* | 3/2022 | Choi | H04W 64/003 |
| 2022/0077919 A1* | 3/2022 | Li | H04B 7/04 |
| 2022/0078581 A1* | 3/2022 | Choi | G01S 5/0269 |
| 2022/0128684 A1* | 4/2022 | Keating | G01S 13/765 |
| 2022/0179097 A1* | 6/2022 | Gunnarsson | G01S 19/252 |
| 2022/0217673 A1* | 7/2022 | Zaidi | H04W 64/00 |
| 2022/0231753 A1* | 7/2022 | Bengtsson | H04B 7/145 |
| 2023/0008390 A1* | 1/2023 | Zorgui | H04W 4/023 |
| 2023/0022225 A1* | 1/2023 | Gunturu | H04B 7/04013 |
| 2023/0076306 A1* | 3/2023 | Gunnarsson | H04B 7/024 |
| 2023/0097583 A1* | 3/2023 | Lee | H04W 16/28 |
| | | | 370/329 |
| 2023/0164512 A1* | 5/2023 | Gunnarsson | H04W 4/50 |
| | | | 455/456.1 |
| 2023/0180094 A1* | 6/2023 | Gurelli | H04W 72/044 |
| | | | 370/336 |
| 2023/0199734 A1* | 6/2023 | Sun | H04L 5/0023 |
| | | | 370/329 |
| 2023/0208025 A1* | 6/2023 | Song | H01Q 3/16 |
| | | | 343/757 |
| 2023/0283105 A1* | 9/2023 | Lee | H02J 50/20 |
| | | | 307/104 |
| 2023/0283357 A1* | 9/2023 | Wei | H04B 7/15557 |
| | | | 455/11.1 |
| 2023/0284055 A1* | 9/2023 | Wei | H04B 17/40 |
| | | | 370/252 |
| 2023/0288524 A1* | 9/2023 | Yerramalli | G01S 5/0036 |
| 2024/0114480 A1* | 4/2024 | Duan | G01S 13/74 |
| 2024/0129891 A1* | 4/2024 | Manolakos | H04B 7/06968 |
| 2024/0155537 A1* | 5/2024 | Priyanto | H04W 24/10 |
| 2024/0171340 A1* | 5/2024 | Vogedes | H04L 5/0048 |
| 2024/0172163 A1* | 5/2024 | Alizadeh | H04L 1/1607 |
| 2024/0210514 A1* | 6/2024 | Thomas | H04W 64/00 |
| 2024/0244573 A1* | 7/2024 | Muddukrishna | H04W 64/003 |

OTHER PUBLICATIONS

Wymeersch H., et al., "Radio Localization and Mapping with Reconfigurable Intelligent Surfaces", arxiv.org, 201 Olin Library Cornell University, Ithaca, NY, 14853, Dec. 19, 2019, XP081569725, pp. 1-7, Figure 1, Abstract, Right-Hand Column, Lines 29-31, Figure 3, pp. 5,6, p. 2, left-hand column, line 2-8 p. 3, left-hand column, line 2-4 p. 4, right-hand column, lines 6, 7, 11, 12, 36, 37 p. 5, left-hand column, line 15-17, pp. 5,6, Figure 3, pp. 4-5, Section RIS Control.

* cited by examiner

UE POSITIONING IN THE PRESENCE OF AN INTELLIGENT REFLECTING SURFACE (IRS)

BACKGROUND

1. Field of Disclosure

The present disclosure relates generally to the field of wireless communications, and more specifically to user equipment (UE) positioning in the presence of an intelligent reflecting surface (IRS).

2. Description of Related Art

In a wireless communication network, positioning of a UE can involve measurements of a reference signal (e.g., a radio frequency (RF) signal) determined by a receiving device. When blockages happen, IRS may be used for transmitting the reference signal from one or more base stations of the wireless communication network to one or more receiving devices. However, the involvement of the IRS may cause inaccuracy/incorrectness in determining distance and/or angular information based on the reference signal transmitted using the IRS.

BRIEF SUMMARY

Embodiments described herein provide for the determination of the location of a UE in a wireless communication system where one or more IRSs are present (e.g., being used for transmitting the reference signal). More specifically, after being notified that an IRS is used in transmitting the reference signal (e.g., a positioning reference signal (PRS)), a notification may be transmitted to the UE (e.g., by flagging the reference signal and/or by transmitting a separate message) indicating that the reference signal is transmitted via the IRS. Responsive, at least in part to, receiving the notification, the positioning of the UE will be prevented from being based on the reference signal. By preventing the positioning of the UE from being based on the reference signal transmitted via the IRS, the accuracy of the positioning of the UE can be improved.

An example method of positioning a user equipment (UE) by a location server in a wireless communications network, the method may comprises receiving a request to perform positioning of the UE and receiving a notification from a first base station indicating that a transmission path between the first base station and the UE is via an intelligent reflecting surface (IRS). The method may further comprise responsive, at least in part, to receiving the notification, preventing the positioning of the UE from being based on a reference signal transmitted through the transmission path between the first base station and the UE.

An example method of positioning a user equipment (UE) by the UE in a wireless communications network may comprises receiving a reference signal from a first base station, wherein a transmission path between the first base station and the UE is via an intelligent reflecting surface (IRS) and receiving an indication indicating the reference signal is transmitted through the transmission path between the first base station and the UE via the IRS. The method may further include responsive, at least in part, to receiving the indication, preventing the positioning of the UE from being based on the reference signal.

An example device may comprise a transceiver configured to receive a request to perform positioning of a UE and receive a notification from a first base station indicating that a transmission path between the first base station and the UE is via an intelligent reflecting surface (IRS). The device may also comprise a memory and one or more processing units communicatively coupled with the transceiver and the memory, the one or more processing units configured to responsive, at least in part, to receiving the notification, prevent the positioning of the UE from being based on a reference signal transmitted through the transmission path between the first base station and the UE.

An example user equipment may comprise a wireless communication interface configured to receive a reference signal from a first base station, wherein a transmission path between the first base station and the UE is via an intelligent reflecting surface (IRS) and receive an indication indicating the reference signal is transmitted through the transmission path between the first base station and the UE via the IRS. The user equipment may further comprise a memory and one or more processing units communicatively coupled to the wireless communication interface and the memory, the one or more processing units configured to responsive, at least in part, to receive the notification, prevent the positioning of the UE from being based on the reference signal transmitted through the transmission path between the first base station and the UE.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
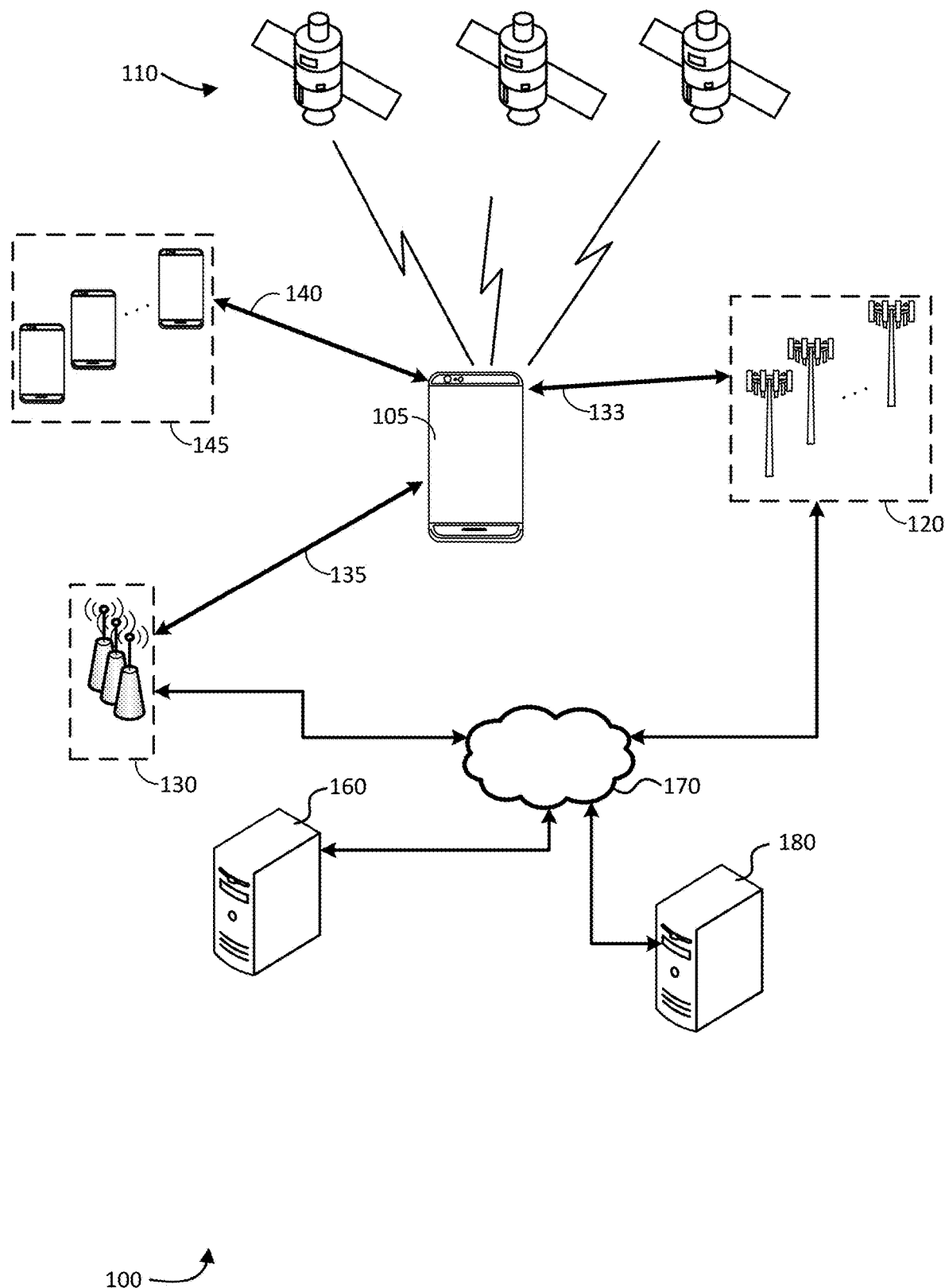
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

In a wireless communication network, positioning of a UE can involve measurements of a reference signal (e.g., a radio frequency (RF) signal) determined by a receiving device. IRSs may be configured as a means to enable propagation paths for RF signals around blockage. With the presence of IRS s, the coverage of the base station (e.g., the wireless network of the base station) can be extended to otherwise unreachable areas. However, compared with directly transmitting the RF signal, when an IRS is being used for transmitting the RF signal (e.g., a transmission path between the transceiver and the receiver is via an IRS) the propagation delay for transmitting the RF signal increases. As a result, positioning methods that are based on measurements generated using transmitted positioning reference signals (PRSs), such as Time Difference Of Arrival (TDOA), angle of arrival (AoA), angle of departure (AoD), Reference Signal Time Difference (RSTD), round trip signal propagation delay (RTT), multi-cell RTT, etc. would become inaccurate and/or incorrect.

Described herein are systems, devices, methods, media and other implementations for UE positioning in the presence of an IRS. In some embodiments, after receiving a request to perform positioning of a UE, a location server (e.g., a Location Management Function (LMF)) may receive a notification from the transmitting base station indicating that the transmission path between the base station and a receiving device (e.g., the UE) is via an IRS. Responsive, at least in part, to receiving the notification, the location server may prevent the positioning of the UE from being based on a reference signal (e.g., a PRS) transmitted through the transmission path between the base station and the receiving device. In some embodiments, the location server may flag the reference signal and/or transmit a separate notification to the UE, configuring the UE not to perform positioning based on the reference signal. After receiving the configuration from the location server (e.g., by receiving a flagged PRS and/or a separate notification from the location server), the UE may be configured not to generate measurements (e.g., TDOA, AoA, AoD, RSTD, RTT, and/or multi-cell RTT) based on the flagged reference signal. In case that the measurements are generated, depending on the type of the positioning method (e.g., UE-assisted positioning or UE-based positioning), the UE may be configured to not transmit the measurements to the location server for calculating/determining a position of the UE using the measurements or to not calculate/determine the position of the UE using the measurements.

In some embodiments, prior to preventing the positioning of the UE from being based on the reference signal, the location server may also request the base station (e.g., by sending a request) not to transmit the reference signal through the transmission path between the base station and the UE. For example, the location server may request the base station to switch off the IRS for transmitting the reference signal (e.g., by controlling the IRS using a control channel). In some embodiments, responsive, at least in part, to receiving an indication from the base station that the request not to transmit the reference signal through the transmission path between the base station and the UE has been denied, the location server may prevent the positioning of the UE from being based on the reference signal as mentioned above.

Concurrently, after receiving the notification from the transmitting base station indicating that the transmission path between the base station and a receiving device (e.g., the UE) is via an IRS, in some embodiments, the location server may also configure another base station for positioning the UE (e.g., transmitting the PRS to the UE), where a transmission path between the other base station and the UE includes no IRS (e.g., with no IRS's presence). Additional details will follow after an initial description of relevant systems and technologies.

FIG. 1 is a simplified illustration of a positioning system 100 in which a UE 105, location server 160, and/or other components of the positioning system 100 can use the techniques provided herein for user equipment (UE) positioning in the presence of an intelligent reflecting surface (IRS), according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, network 170 may comprise any of a variety of wireless and/or wireline networks. Network 170 can, for example, comprise any combination of public and/or private networks, local and/or wide-area networks, and the like. Furthermore, network 170 may utilize one or more wired and/or wireless communication technologies. In some embodiments, network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

Base stations 120 and access points (APs) 130 may be communicatively coupled to network 170. In some embodiments, base station 120s may be owned, maintained, and/or operated by a cellular network provider, and may employ any of a variety of wireless technologies, as described herein below. Depending on the technology of network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing network 170 via a base station 120 using a first communication link 133. Additionally or alternatively, because APs 130 also may be communicatively coupled with network 170, UE 105 may communicate with network-connected and Internet-connected devices, including location server 160, using a second communication link 135, or via one or more other UEs 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g., with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by UE 105. In particular, these measurements can provide information regarding the relative distance and/or angle of UE 105 from one or more components in positioning system 100 (e.g., GNSS satellites 110, APs 130, base stations 120). The estimated location of UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of UE 105 may be estimated at least in part based on measurements of RF signals 140 communicated between UE 105 and one or more other UEs 145, which may be mobile or fixed. When one or more other UEs 145 are used in the position determination of a particular UE 105, UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of another UE 145 at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
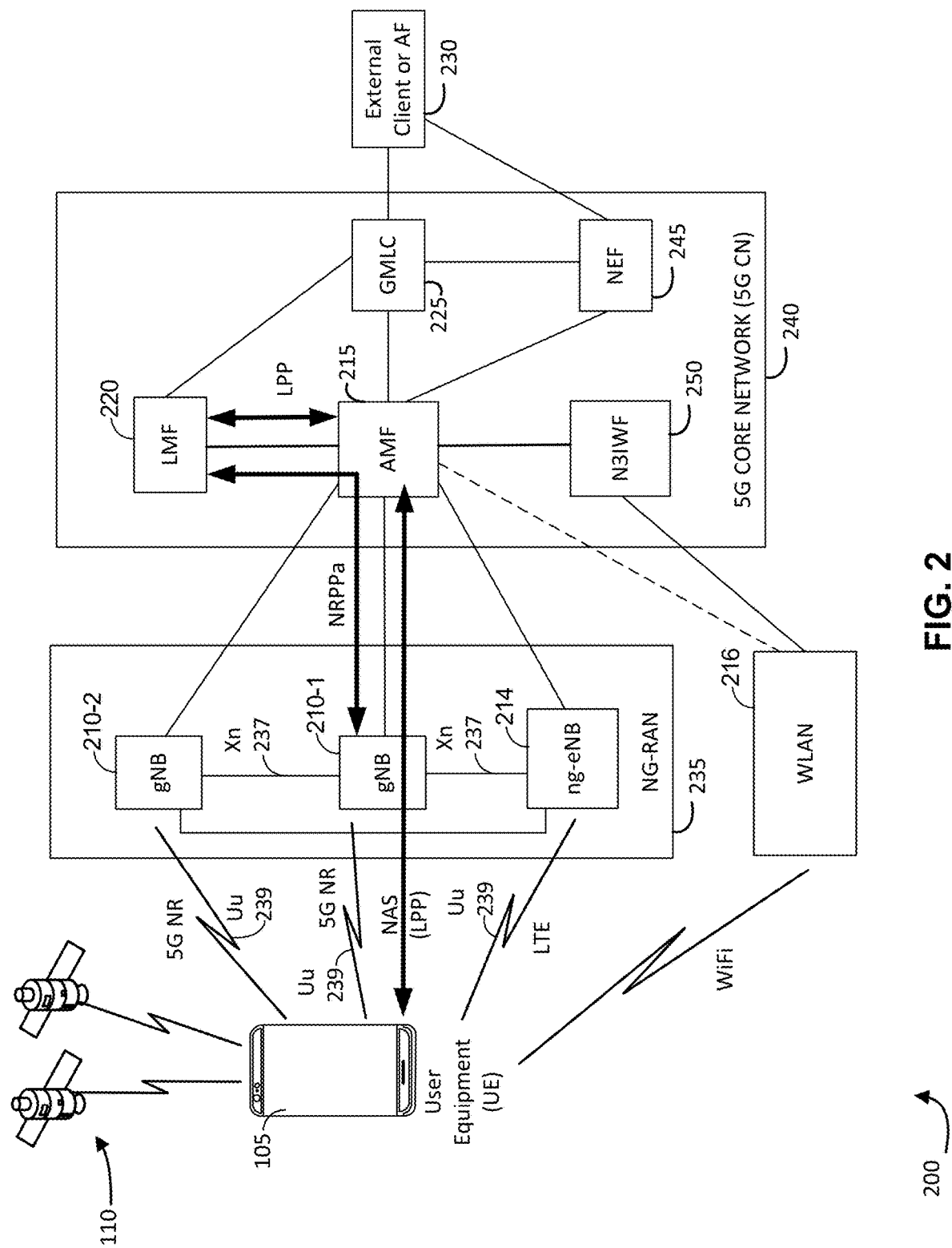
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of 5G NR positioning system 200 are described below. 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in 5G NR positioning system 200 include data and signaling connections which may include additional (intermediary) components, direct or indirect physical and/or wireless connections, and/ or additional networks. Furthermore, components may be rearranged, combined, separated, substituted, and/or omitted, depending on desired functionality.

UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding UE 105 (e.g., via the GMLC 225). The external client 230 of FIG. 2 may correspond to external client 180 of FIG. 1, as implemented in or communicatively coupled with a 5G NR network.

UE 105 may include a single entity or may include multiple entities, such as in a personal area network where a user may employ audio, video and/or data I/O devices, and/or body sensors and a separate wireline or wireless modem. An estimate of a location of UE 105 may be referred to as a location, location estimate, location fix, fix, position, position estimate, or position fix, and may be geodetic, thus providing location coordinates for UE 105 (e.g., latitude and longitude), which may or may not include an altitude component (e.g., height above sea level, height above or depth below ground level, floor level or basement level). Alternatively, a location of UE 105 may be expressed as a civic location (e.g., as a postal address or the designation of some point or small area in a building such as a particular room or floor). A location of UE 105 may also be expressed as an area or volume (defined either geodetically or in civic form) within which UE 105 is expected to be located with some probability or confidence level (e.g., 67%, 95%, etc.). A location of UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g., for latitude, longitude and altitude above or below mean sea level).

Base stations in NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between UE 105 and one or more of the gNBs 210, which may provide wireless communications access to the 5G CN 240 on behalf of the UE 105 using 5G NR. The wireless interface between base stations (gNBs 210 and/or ng-eNB 214) and UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNB s 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105 and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNB s supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

gNBs 210 and ng-eNB 214 can communicate with an AMF 215, which, for positioning functionality, communicates with an LMF 220. AMF 215 may support mobility of UE 105, including cell change and handover of UE 105 from an access node (e.g., gNB 210, ng-eNB 214, or WLAN 216) of a first RAT to an access node of a second RAT. AMF 215 may also participate in supporting a signaling connection to the UE 105 and possibly data and voice bearers for the UE 105. The LMF 220 may support positioning of UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. LMF 220 may also process location service requests for the UE 105, e.g., received from AMF 215 or from GMLC 225. LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at UE 105 (e.g., by measuring downlink PRS (DL-PRS) signals transmitted by wireless nodes such as gNBs 210, ng-eNB 214 and/or WLAN 216, and/or using assistance data provided to UE 105, e.g., by LMF 220).

The Gateway Mobile Location Center (GMLC) 225 may support a location request for UE 105 received from an external client 230 and may forward such a location request to AMF 215 for forwarding by the AMF 215 to LMF 220. A location response from LMF 220 (e.g., containing a location estimate for UE 105) may be similarly returned to GMLC 225 either directly or via the AMF 215, and GMLC 225 may then return the location response (e.g., containing the location estimate) to external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and LMF 220, and/or between an ng-eNB 214 and LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between LMF 220 and AMF 215 using messages for service-based operations (e.g., based on the Hypertext Transfer Protocol (HTTP)) and may be transferred between AMF 215 and UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and LMF 220, via AMF 215 and N3IWF 250 to support network-based positioning of UE 105 and/or transfer of other location information from WLAN 216 to LMF 220. Alternatively, NRPPa messages may be transferred between N3IWF 250 and LMF 220, via AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between UE 105 and LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of UE 105 also may be categorized as UL, DL, or DL-UL based, depending on the types of signals used for positioning. If, for example, positioning is based solely on signals received at UE 105 (e.g., from a base station or other UE), the positioning may be categorized as DL based. On the other hand, if positioning is based solely on signals transmitted by UE 105 (which may be received by a base station or other UE, for example), the positioning may be categorized as UL based. Positioning that is DL-UL based includes positioning, such as RTT-based positioning, that is based on signals that are both transmitted and received by UE 105. Sidelink (SL)-assisted positioning comprises signals communicated between UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
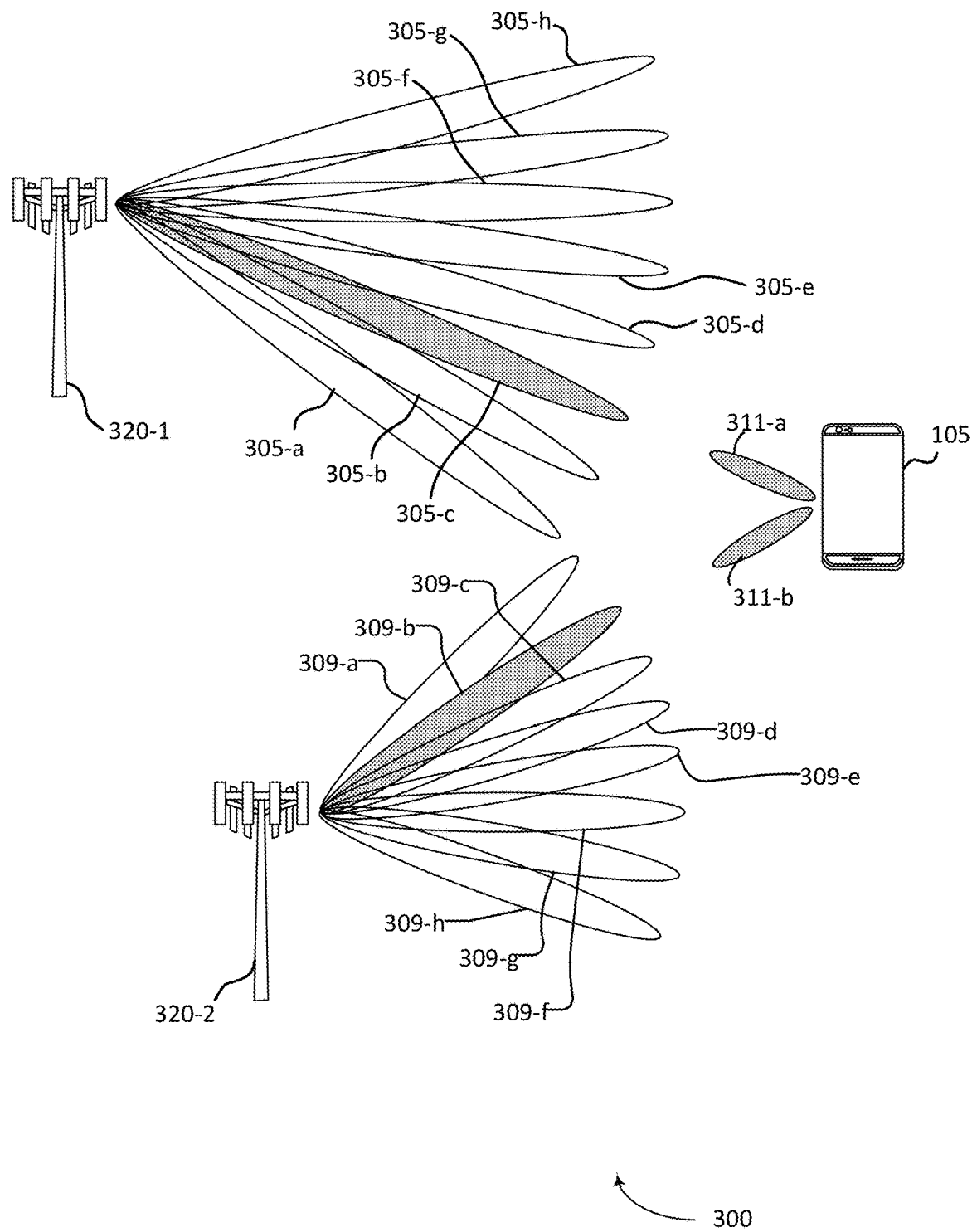
FIG. 3 is a diagram illustrating beamforming in a 5G NR positioning system.

FIG. 3 is a diagram illustrating a simplified environment 300 including two TRPs 320-1 and 320-2 (which may correspond to base stations 120 of FIG. 1 and/or gNB s 210 and/or ng-eNB 214 of FIG. 2) with antenna arrays that can perform beamforming to produce directional beams for transmitting and/or receiving reference signals. FIG. 3 also illustrates a UE 105, which may also use beamforming for transmitting and/or receiving reference signals. Such directional beams are used in 5G NR wireless communication networks. Each directional beam may have a beam width centered in a different direction, enabling different beams of a TRP 320 to correspond with different areas within a coverage area for TRP 320.

Different modes of operation may enable TRPs 320-1 and 320-2 to use a larger or smaller number of beams. For example, in a first mode of operation, a TRP 320 may use 16 beams, in which case each beam may have a relatively wide beam width. In a second mode of operation, a TRP 320 may use 64 beams, in which case each beam may have a relatively narrow beam width. Depending on the capabilities of a TRP 320, the TRP may use any number of beams TRP 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, UE 105 may be capable of using different numbers of beams, which may also correspond to different modes of operation, signal types, etc.

In some situations, a TRP 320 may use beam sweeping. Beam sweeping is a process in which TRP 320 may send an RF signal in different directions using different respective beams, often in succession, effectively "sweeping" across a coverage area. For example, a TRP 320 may sweep across 120 or 360 degrees in an azimuth direction, for each beam sweep, which may be periodically repeated. Each direction beam can include an RF reference signal (e.g., a PRS resource), where base station 120-1 produces a set of RF reference signals that includes Tx beams 305-*a*, 305-*b*, 305-*c*, 305-*d*, 305-*e*, 305-*f*, 305-*g*, and 305-*h*, and the base station 120-2 produces a set of RF reference signals that includes Tx beams 309-*a*, 309-*b*, 309-*c*, 309-*d*, 309-*e*, 309-*f*, 309-*g*, and 309-*h*. As noted, because UE 105 may also include an antenna array, it can receive RF reference signals transmitted by base stations 120-1 and 120-2 using beamforming to form respective receive beams (Rx beams) 311-*a* and 311-*b*. Beamforming in this manner (by base stations 120 and optionally by UEs 105) can be used to make communications more efficient. They can also be used for other purposes, including taking measurements for position determination (e.g., AoD and AoA measurements).

Figure 4:
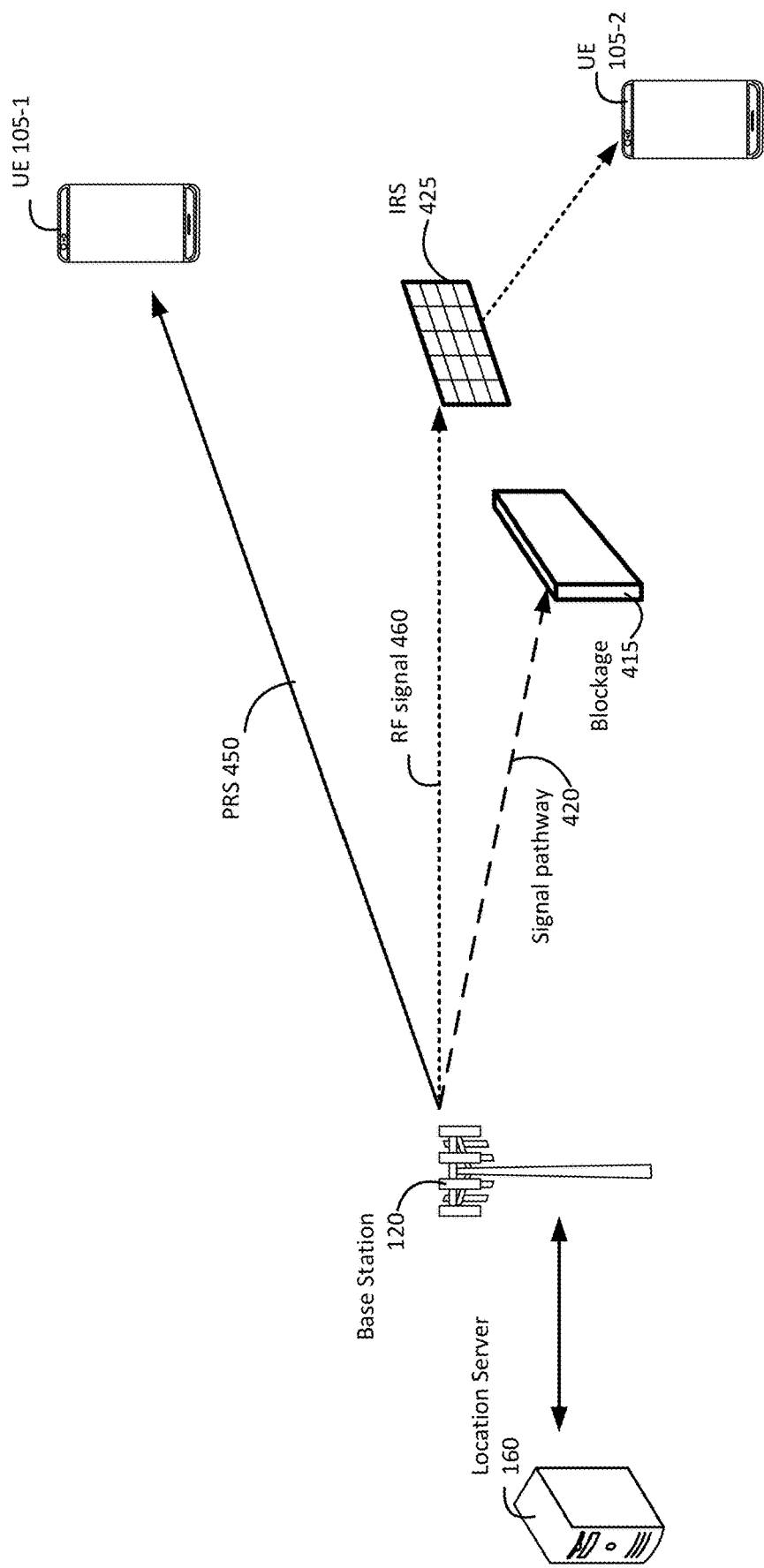
FIG. 4 is a simplified diagram illustrating how a reference signal may be transmitted using an IRS.

FIG. 4 is a simplified diagram illustrating how a RF signal is transmitted with or without the presence of an IRS. Here, the RF signal is transmitted by a base station 120 (which may comprise a serving base station for UE 105) and received by UE 105-1 and UE 105-2 (collectively and generically referred to herein as UE 105). For example, the RF signal may be directly transmitted from base station 120 to UE 105-1 where UE 105-1 may perform UE positioning based on the RF signal (e.g., a PRS) transmitted. However, in instances where there is a blockage 415 (e.g., an obstacle such as a wall) blocking a signal pathway 420 from base station 120 to UE 105-2, an IRS 425 may be used for transmitting the RF signal.

IRSs (which also may be referred to as a software-controlled metasurfaces, reconfigurable intelligent surface, or reconfigurable reflect arrays/metasurfaces) are garnering recent attention in wireless communication applications as a means to enable propagation paths for RF signals around blockage. Although IRS 425 may be a passive device, it may comprise an array and may therefore redirect RF signals (e.g., RF signal 460) using beamforming. As such, IRS 425 can enable wireless coverage of base station 120 (or, more broadly, the wireless network of base station 120) to extend to otherwise unreachable areas. IRS 425 can do this using a software-controlled reflection/scattering profile to redirect wireless signals toward UE 105 in real time. Additionally or alternatively, an IRS 425 may act as a repeater by receiving signals transmitted by a base station 120 and directing them toward a UE 105. (As used herein, "directing," "redirecting," "reflecting," and similar terms used when referring to the functionality of IRS 425 may refer to the reflecting and/or repeating functionality of an IRS.) The functionality of IRS 425 can be controlled by base station 120 using a control channel. This adds controllable paths to the channel between base station 120 and UE 105, which is useful in environments with severe blockage 415.

According to embodiments herein, in some instances, UE positioning (e.g., based on PRSs) may be accomplished by transmitting a reference signal 450 (e.g., a PRS) from a base station 120 to UE 105-1 directly (e.g., when there is no blockage blocking the transmission path between base station 120 and UE 105-1) and calculating the position of UE 105-1 based on measurements generated using reference signal 450 (e.g., TDOA, AoA, AoD, RSTD, RTT, and/or multi-cell RTT). In some embodiments, the UE positioning processes may be facilitated with the use of a location server 160. As discussed in more detail below, UE 105-1 or location server 160 may determine the position of UE 105-1, depending on desired functionality. However, in instances where a blockage 415 blocking a signal pathway 420 from base station 120 to UE 105-2, a RF signal 460 may be transmitted using an IRS 425 to redirect RF signal 460 to UE 105-2. Accordingly, if perform UE positioning for UE 105-2 based on RF signal 460, inaccuracy/incorrectness may happen because the signal path for transmitting RF signal 460 is not direct (e.g., via IRS 425) and the propagation delay increases accordingly.

It can be noted that, although a single base station 120, a single IRS 425, and two UEs 105 are illustrated in FIG. 4, embodiments are not so limited. According to some embodiments, configurations may be used in which there are a plurality of base stations 120 (transmitters), a plurality of IRS 425, and/or a different number of UEs 105 (receivers).

Further, it can be noted that the receiving device in a configuration for UE positioning may not be limited to UE 105. The receiving device may comprise, for example, another base station 120 (e.g., a regular gNB or small cell gNB). Furthermore, in instances in which multiple receiving devices are used, a single IRS may reflect signals to multiple receiving devices and/or multiple IRSs may be used to reflect signals to multiple receiving devices.

In some embodiments, as disclosed above, in a 5G NR communication system, a UE positioning can be performed based on transmitting a reference signal (e.g., a PRS) from a base station (e.g., base station 120) to a receiving device (e.g., UE 105) the position of which is to be determined (e.g., the object of the positioning process). In some embodiments, a PRS is a predefined RF signal occupying specific Resource Elements (REs) (e.g., a radio frame sequence with specifically designed PRS positioning occasions in NR specifications). When using PRS based UE positioning, PRSs can be transmitted with the highest possible levels of accuracy, coverage, and interference avoidance and suppression.

Figure 5:
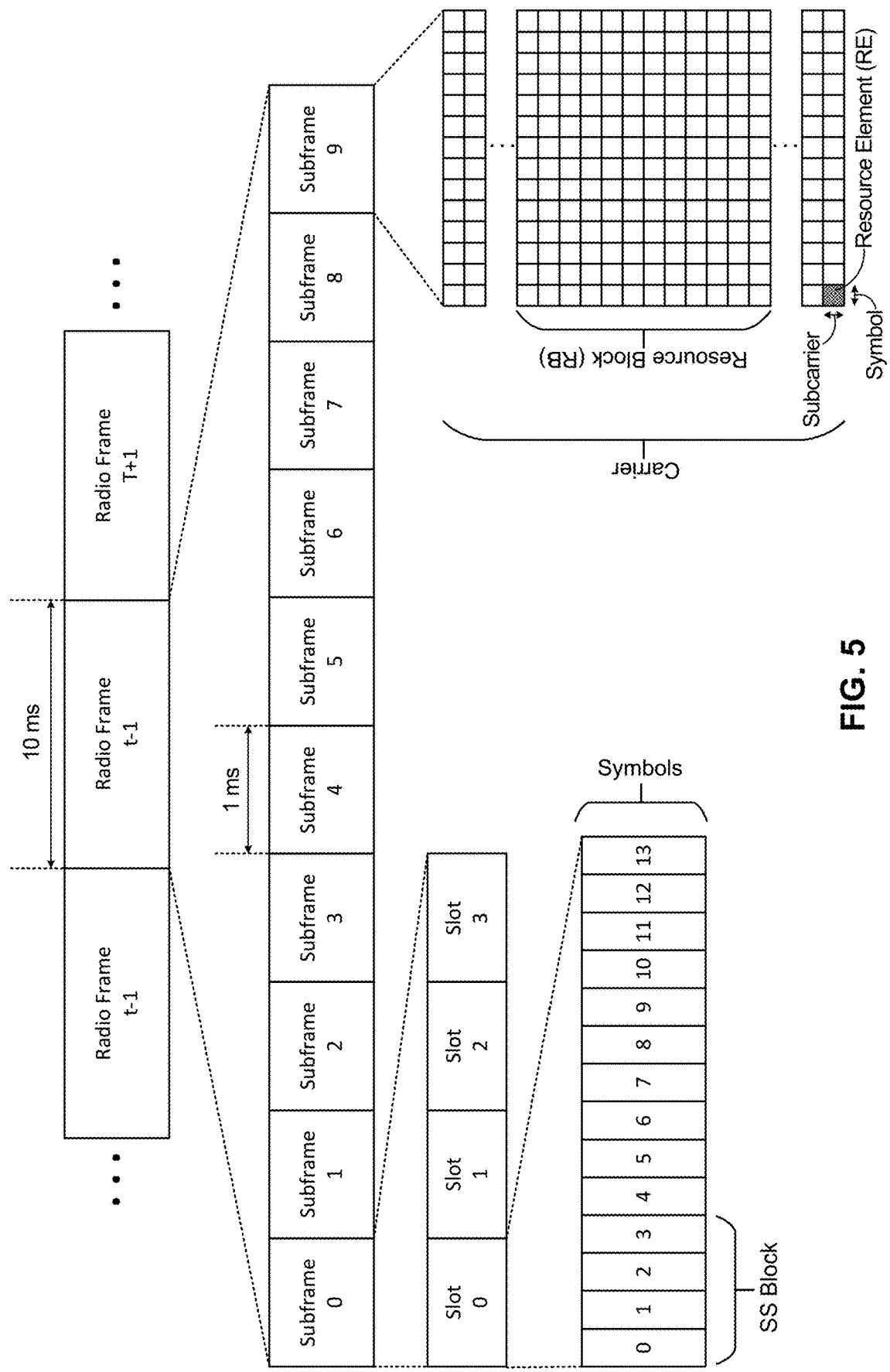
FIG. 5 is a diagram showing an example of a frame structure for NR and associated terminology.

FIG. 5 is a diagram showing an example of a frame structure for NR and associated terminology, which can serve as the basis for physical layer communication between the UE 105 and base stations/TRPs. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 5 is the complete Orthogonal Frequency-Division Multiplexing (OFDM) of a subframe, showing how a subframe can be divided across both time and frequency into a plurality of Resource Blocks (RBs). A single RB can comprise a grid of REs spanning 14 symbols and 12 subcarriers.

Each symbol in a slot may indicate a link direction (e.g., downlink (DL), uplink (UL), or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 5. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

Figure 6:
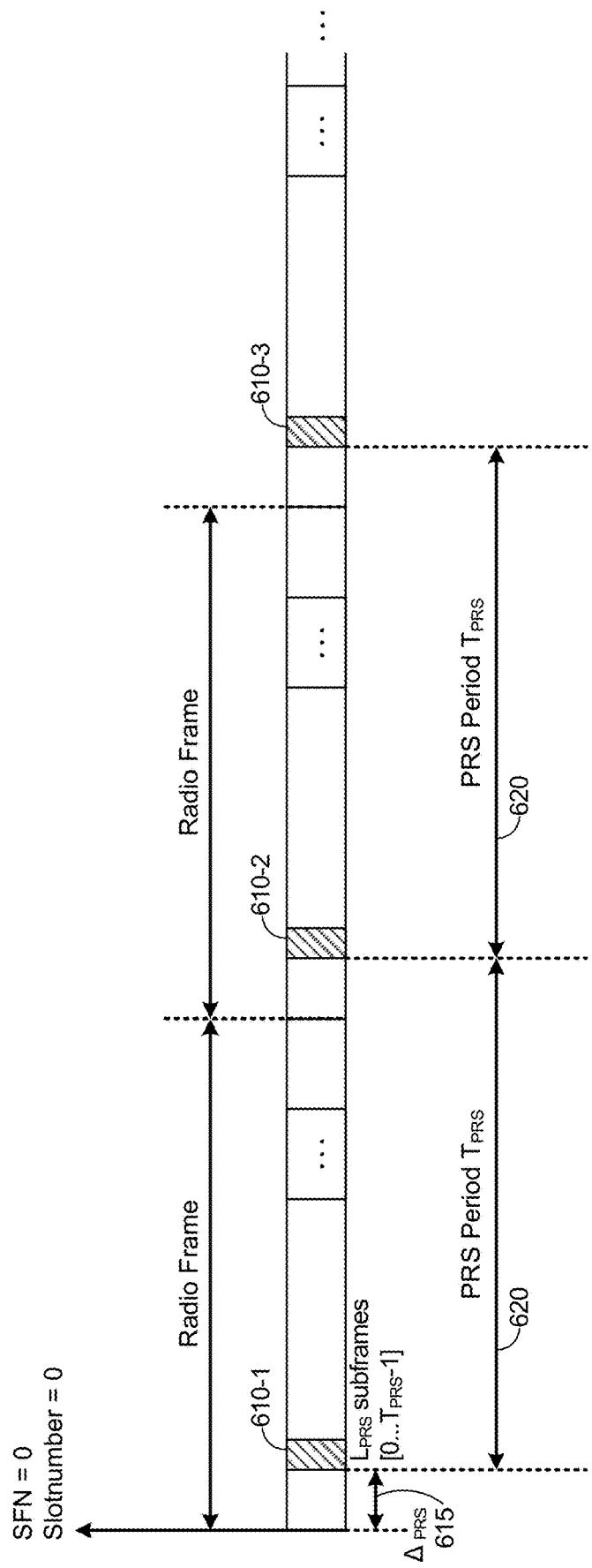
FIG. 6 is a diagram showing an example of a radio frame sequence with PRS positioning occasions.

FIG. 6 is a diagram showing an example of a radio frame sequence 600 with PRS positioning occasions. A "PRS instance" or "PRS occasion" is one instance of a periodically repeated time window (e.g., a group of one or more consecutive slots) where PRSs are expected to be transmitted. A PRS occasion may also be referred to as a "PRS positioning occasion," a "PRS positioning instance, a "positioning occasion," "a positioning instance," or simply an "occasion" or "instance." Subframe sequence 600 may be applicable to broadcast of PRS signals (DL-PRS signals) from base stations 120 in positioning system 100. The radio frame sequence 600 may be used in 5G NR (e.g., in 5G NR positioning system 200) and/or in LTE. Similar to FIG. 5, time is represented horizontally (e.g., on an X axis) in FIG. 6, with time increasing from left to right. Frequency is represented vertically (e.g., on a Y axis) with frequency increasing (or decreasing) from bottom to top.

FIG. 6 shows how PRS positioning occasions 610-1, 610-2, and 610-3 (collectively and generically referred to herein as positioning occasions 610) are determined by a System Frame Number (SFN), a cell-specific subframe offset ($\Delta_{PRS}$) 615, a length or span of $L_{PRS}$ subframes, and the PRS Periodicity ($T_{PRS}$) 620. The cell-specific PRS subframe configuration may be defined by a "PRS Configuration Index," $I_{PRS}$, included in assistance data (e.g., TDOA assistance data), which may be defined by governing 3GPP standards. The cell-specific subframe offset ($\Delta_{PRS}$) 615 may be defined in terms of the number of subframes transmitted starting from System Frame Number (SFN) 0 to the start of the first (subsequent) PRS positioning occasion.

A PRS may be transmitted by wireless nodes (e.g., base stations 120) after appropriate configuration (e.g., by an Operations and Maintenance (O&M) server). A PRS may be transmitted in special positioning subframes or slots that are grouped into positioning occasions 610. For example, a PRS positioning occasion 610-1 can comprise a number $N_{PRS}$ of consecutive positioning subframes where the number $N_{PRS}$ may be between 1 and 160 (e.g., may include the values 1, 2, 4 and 6 as well as other values). PRS occasions 610 may be grouped into one or more PRS occasion groups. As noted, PRS positioning occasions 610 may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). In some embodiments, $T_{PRS}$ may be measured in terms of the number of subframes between the start of consecutive positioning occasions.

In some embodiments, when a UE 105 receives a PRS configuration index $I_{PRS}$ in the assistance data for a particular cell (e.g., base station), UE 105 may determine the PRS periodicity $T_{PRS}$ 620 and cell-specific subframe offset ($\Delta_{PRS}$) 615 using stored indexed data. UE 105 may then determine the radio frame, subframe, and slot when a PRS is scheduled in the cell. The assistance data may be determined by, for example, a location server (e.g., location server 160 in FIG. 1 and/or LMF 220 in FIG. 2), and includes assistance data for a reference cell, and a number of neighbor cells supported by various wireless nodes.

Typically, PRS occasions from all cells in a network that use the same frequency are aligned in time and may have a fixed known time offset (e.g., cell-specific subframe offset ($\Delta_{PRS}$) 615) relative to other cells in the network that use a different frequency. In SFN-synchronous networks all wireless nodes (e.g., base stations 120) may be aligned on both frame boundary and system frame number. Therefore, in SFN-synchronous networks all cells supported by the various wireless nodes may use the same PRS configuration index for any particular frequency of PRS transmission. On the other hand, in SFN-asynchronous networks, the various wireless nodes may be aligned on a frame boundary, but not system frame number. Thus, in SFN-asynchronous networks the PRS configuration index for each cell may be configured separately by the network so that PRS occasions align in time. A UE 105 may determine the timing of the PRS occasions 610 of the reference and neighbor cells for TDOA positioning, if UE 105 can obtain the cell timing (e.g., SFN or Frame Number) of at least one of the cells, e.g., the reference cell or a serving cell. The timing of the other cells may then be derived by the UE 105 based, for example, on the assumption that PRS occasions from different cells overlap.

With reference to the frame structure in FIG. 5, a collection of REs that are used for transmission of PRS is referred to as a "PRS resource." The collection of resource elements can span multiple RBs in the frequency domain and one or more consecutive symbols within a slot in the time domain, inside which pseudo-random Quadrature Phase Shift Keying (QPSK) sequences are transmitted from an antenna port of a TRP. In a given OFDM symbol in the time domain, a PRS resource occupies consecutive RBs in the frequency domain. The transmission of a PRS resource within a given RB has a particular combination, or "comb," size. (Comb size also may be referred to as the "comb density.") A comb size "N" represents the subcarrier spacing (or frequency/tone spacing) within each symbol of a PRS resource configuration, where the configuration uses every Nth subcarrier of certain symbols of an RB. For example, for comb-4, for each of the four symbols of the PRS resource configuration, REs corresponding to every fourth subcarrier (e.g., subcarriers 0, 4, 8) are used to transmit PRS of the PRS resource. Comb sizes of comb-2, comb-4, comb-6, and comb-12, for example, may be used in PRS.

A "PRS resource set" comprises a group of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a cell ID). A "PRS resource repetition" is a repetition of a PRS resource during a PRS occasion/instance. The number of repetitions of a PRS resource may be defined by a "repetition factor" for the PRS resource. In addition, the PRS resources in a PRS resource set may have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set may be associated with a single beam (and/or beam ID) transmitted from a single TRP (where a TRP may transmit one or more beams). That is, each PRS resource of a PRS resource set may be transmitted on a different beam, and as such, a PRS resource (or simply "resource") can also be referred to as a "beam." Note that this does not have any implications on whether the TRPs and the beams on which PRS are transmitted are known to the UE.

In the 5G NR positioning system 200 illustrated in FIG. 2, a TRP (gNB 210, ng-eNB 214, and/or WLAN 216) may transmit frames, or other physical layer signaling sequences, supporting PRS signals (i.e. a DL-PRS) according to frame configurations as previously described, which may be measured and used for position determination of UE 105. As noted, other types of wireless network nodes, including other UEs, may also be configured to transmit PRS signals configured in a manner similar to (or the same as) that described above. Because transmission of a PRS by a wireless network node may be directed to all UEs within radio range, the wireless network node may be considered to transmit (or broadcast) a PRS.

Figure 7:
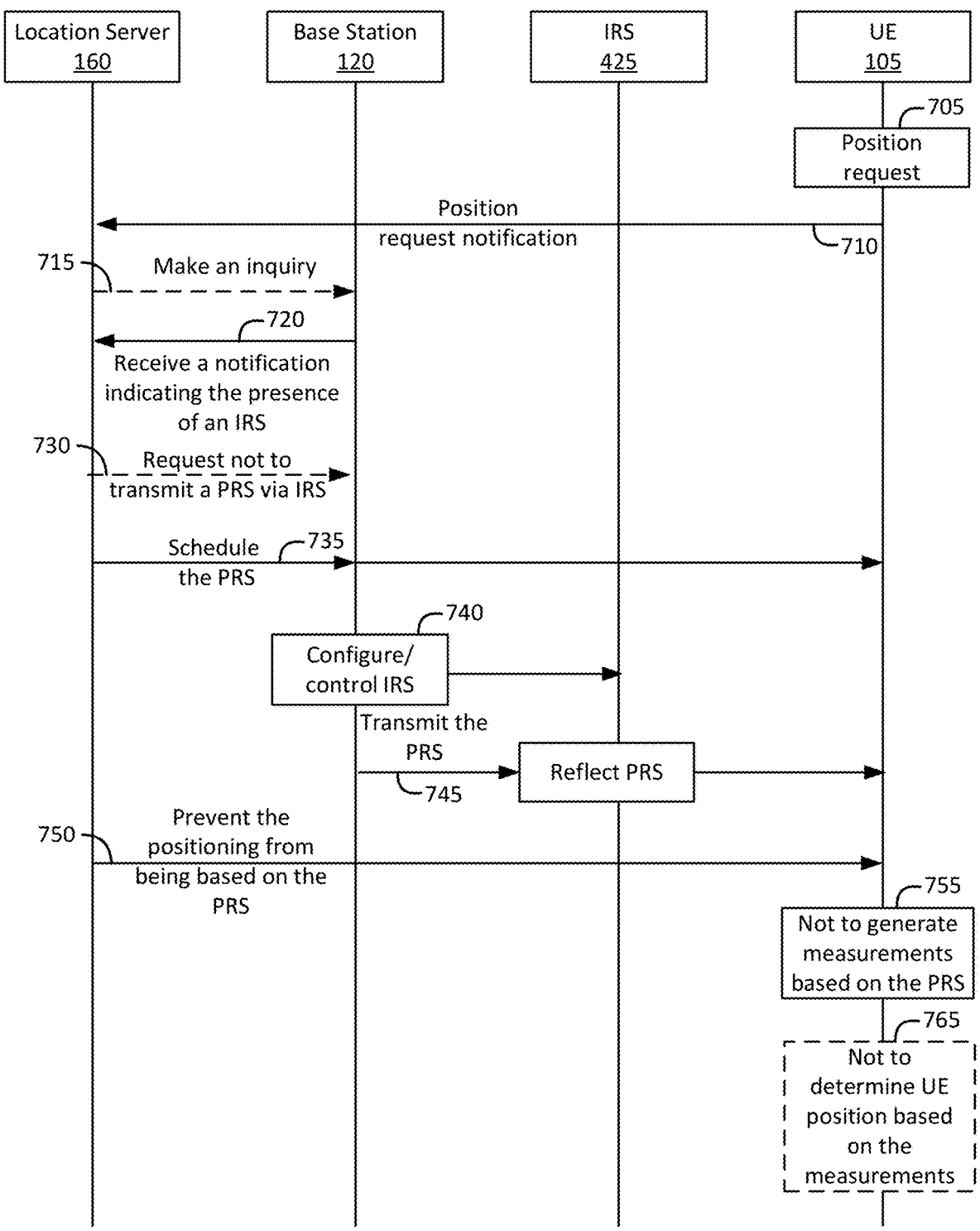
FIGS. 7 and 8 are call-flow diagrams of processes of performing position determination of a UE in presence of an IRS, according to some embodiments.
Figure 8:
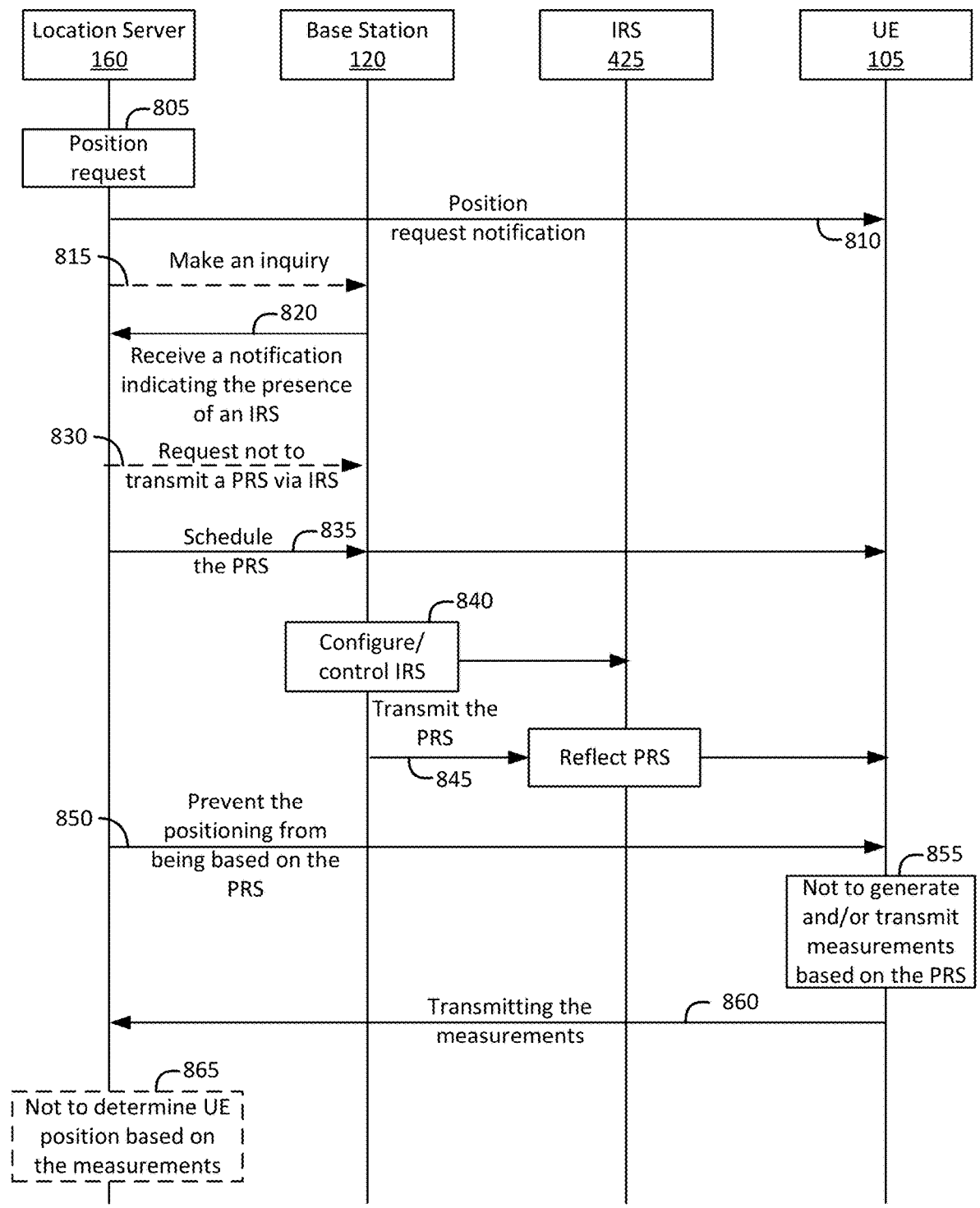

In some embodiments, calculation of a position of UE 105 may be performed by different entities, depending on desired functionality. This may depend, for example, on whether a request for the position of UE 105 comes from UE 105 or whether the request for the position of UE 105 comes from the network or other entity (such as location server 160 of FIG. 1 or LMF 220 of FIG. 2). Accordingly, different processes can be used to determine the position of UE 105. FIGS. 7 and 8 illustrate two example processes. It can be noted, however, that embodiments are not limited to the "positioning" of a UE per se.

FIG. 7 is a call-flow diagram illustrating an embodiment of a process of performing UE-based (or UE-initiated) positioning in the presence of an IRS, according to an embodiment. As with the other figures provided herein, FIG. 7 is provided as a nonlimiting example. As discussed in more detail below, alternative embodiments may perform certain functions in a different order, simultaneously, etc. It can be noted that arrows between the various components illustrated in FIG. 7 illustrate messages or information sent from one component to another. Further (although not explicitly indicated in FIG. 7), communications between base station 120 and UE 105 may occur using reflection/redirection of communication signals by IRS 425 in a manner similar to the process illustrated in FIG. 4 (e.g., applying to UL signals from UE 105 to the base station 120 as well).

With regard to communication between the components illustrated in FIG. 7, it will be understood that there may be any number of intervening devices, servers, etc. that may relay such messages, including other components in FIG. 7. (e.g., a message from UE 105 to location server 160 may pass through base station 120, which may be serving base station for UE 105.) Additionally, although reference signals are referred to as PRSs (e.g., DL-PRS transmitted by base station 120), alternative embodiments may utilize other wireless reference signal types. As noted, in some embodiments, a reference signal (e.g., reference signal 450) may be a reference signal specialized to facilitate positioning, which may be a signal that is not otherwise explicitly defined under 5G (or other 3GPP) standards.

In some embodiments, the determination of the location of UE 105 (positioning of UE 105) may enable base station 120 to control IRS 425 such that IRS 425 may reflect one or more wireless reference signals (e.g., a PRS) and/or other signals for UE 105. As noted, the accuracy or even the correctness of the location determined/calculated based on the reference signals transmitted via one or more IRS cannot be guaranteed. Accordingly, upon determining (e.g., being notified by base station 120) that the transmission of the reference signal is via an IRS (e.g., the transmission path between base station 120 and UE 105 is via IRS 425), the location server scheduling the signal transmission (e.g., location server 160) may prevent the positioning of UE 105 from being based on the reference signals transmitted via the IRS (e.g., configure UE 105 not to generate measurements based on the reference signal and/or not to calculate/determine the location based on the measurements generated using the reference signal). Concurrently, the location server may request base station 120 not to transmit the reference signal via the IRS and/or configure another base station (e.g., a neighbor cell) for positioning UE 105 (e.g., switch another base station to perform as the reference/the serving cell) where a transmission path between the other base station and UE 105 includes no IRS. Accordingly, the accuracy of the positioning of UE 105 with presence of an IRS may be increased.

Specifically, at block 705, UE 105 may generate a position request. This position request may come, for example, from an application (or app) executed by UE 105. This may be a result from user interaction with UE 105, based on a determined schedule, or based on other triggers (including user input).

In response, UE 105 may generate a position request notification. As indicated at arrow 710, location server 160 may receive the position request notification, which can coordinate the transmission of RF signals (PRS or other reference signals) by base station 120 for determining the position of UE 105. According to some embodiments, additional communications between UE 105 and location server 160 may occur to determine capabilities of UE 105. In some embodiments, communication between location server 160 and UE 105 may occur via an LPP positioning session, for example.

Indicated in arrow 715, in some embodiments, location server 160 may optionally make an inquiry (e.g., transmitting an inquiry notification) to base station 120 asking if a transmission path between base station 120 and UE 105 is via one or more IRS (e.g., IRS 425). In other words, location server 160 may inquire base station 120 if base station 120 is controlling/using an IRS for transmitting the reference signals to UE 105 (will be disclosed in detail below). In some embodiments, communications between location server 160 and base station 120 (e.g., inquiries, notifications and/or requests) may be based on an LPP Annex (LPPa) or NRPPa protocol.

At arrow 720, in some embodiments, in presence of an IRS (e.g., the transmission path between base station 120 and UE 105 is via IRS 425 and/or base station 120 is engaged in controlling IRS 425 to reflect signals from base station 120 to UE 105 (and vice versa) for communication and/or other purposes) location server 160 may receive a notification from base station 120 indicating the same. For example, in some embodiments, responsive, at least in part, to the inquiry made by location server 160, base station 120 may confirm that the transmission path between base station 120 and UE 105 is via IRS 425 by replying with a notification indicating the same to the inquiry. In some other embodiments, base station 120 may directly transmit a notification to location server 160 specifying the presence of IRS 425 in the communication between base station 120 and UE 105 without receiving an inquiry from location server 160.

In some embodiments, responsive, at least in part, to receiving the notification indicating the presence of IRS 425, at arrow 730, location server 160 may configure base station 120 not to transmit the reference signal (e.g., a PRS) to UE 105 by sending a request notification. For example, when scheduling the transmission and receipt of the reference signal by base station 120 and UE 105, location server 160 may configure base station 120 not to transmit the reference signal to UE 105. Alternatively, location server 160 may configure base station 120 to "switch off" IRS for transmitting the reference signal, e.g., by controlling IRS 425 to not to reflect the reference signal towards UE 105 using a control channel.

Alternatively, in instances where the reference signal is transmitted from base station 120 to UE 105 (e.g., the request notification that not to transmit the reference signal to UE 105 via IRS 425 is denied and/or no such request was made by location server 160), at arrow 735, location server 160 may schedule the transmission and receipt of the reference signal by base station 120 and UE 105. More specifically, the scheduling of the reference signal may involve location server 160 configuring base station 120 to transmit the reference signal.

At block 740, base station 120 can configure/control IRS 425 to help ensure subsequently the transmitted reference signal is directed toward UE 105. According to some embodiments and/or instances, base station 120 may be engaged in controlling IRS 425 in real time to reflect signals from base station 120 to UE 105 (and vice versa) for communication and/or other purposes. Alternatively, according to some embodiments, location server 160 and/or UE 105 may control IRS 425.

Arrow 745 indicates base station 120 transmits the reference signal. As described in the earlier embodiments, the reference signal may comprise a single RF signal transmitted using a wide beam or separate RF signals transmitted using separate names. In either case, IRS 425 can reflect the reference signal to UE 105. In some embodiments, to help UE 105 determine the IRS from which the reference signal from base station 120 are reflected, base station 120 can include an IRS identifier (e.g., IRS ID) associated with the reference signal.

At arrow 750, location server 160 may prevent the positioning of UE 105 from being based on the reference signal transmitted via IRS 425. Specifically, in some embodiments, location server 160 may configure UE 105 not to determine measurements and/or not to calculate/determine a location/position based on the measurements. For example, in some embodiments, location server 160 may flag the reference signal (e.g., in assistance data such as a PRS configuration) transmitted from base station 120 indicating that the reference signal is transmitted via an IRS (e.g., associate a general indicator with the reference signal indicating the transmission of the reference signal is via at least one IRS) and/or a specific IRS (e.g., associate the IRS ID of IRS 425 with the reference signal). In some other embodiments, location server 160 may also indicate the same in a separate notification (e.g., a separate message in addition to the assistance data) sent from location server 160 to UE 105.

In some embodiments, responsive, at least in part, to receiving the indication/configuration from location server 160 (e.g., by receiving the flagged reference signal from base station 120 and/or by receiving the separate notification from location server 160), in block 755, UE 105 may be configured not to generate measurements (e.g., TDOA, AoA, AoD, RSTD, RTT, and/or multi-cell RTT) based on the reference signal. Alternatively, in instances where measurements were generated based on the reference signal, in block 765, UE 105 may be configured not to calculate/determine a location/position of UE 105 based on the measurements generated based on the reference signal.

In some embodiments, location server 160 may further be configured to configure another base station (e.g., a second base station) for positioning the UE (e.g., UE 105), where a transmission path between the other base station and the UE includes no IRS (not shown). For example, upon receiving a notification from the other base station indicating the transmission path between the other base station and UE 105 includes no IRS, location server 160 may schedule the transmission and receipt of the reference signal by the other base station and UE 105 as disclosed above for positioning of UE 105. It is contemplated that the operation for configuring the other base station for positioning UE 105 may be performed concurrent to any element of operations 730-765, namely at any time after arrow 720 when location server 160 receives the notification from base station 120 indicating the transmission path between base station 120 and UE 105 includes IRS 425.

FIG. 8 is call-flow diagram illustrating an embodiment of a process of performing UE-assisted (or network-initiated) UE positioning in the presence of an IRS. Here, calculations and position determination are performed at the location server 160, based on information received from UE 105. Many of the operations performed in the process of FIG. 8 may be similar to the operations performed in the process of FIG. 7, as previously described.

This process may begin with a position request obtained at the location server 160, as indicated at block 805. As indicated previously, UE-assisted (or network-based) positioning can be based on a request from an external client (e.g., external client 180 of FIG. 1 and/or external client 230 of FIG. 2). Additionally or alternatively, the request may come from a service within the wireless network that may need the position of UE 105 to provide particular functionality.

In response to the position request, the location server 160 may notify UE 105 of the position request via position request notification, as indicated at arrow 810. In some embodiments, this may comprise initiating a communication session between location server 160 and UE 105. Among other things, this position request notification at arrow 810 may put UE 105 on notice. In some embodiments, the notice may prepare UE 105 to subsequently take measurements (e.g., TDOA, AoA, AoD, RSTD, RTT, and/or multi-cell RTT) of a reference signal (e.g., a PRS) transmitted by base station 120.

Elements 815-865 may be similar to corresponding features in FIG. 7, as previously described. The difference in FIG. 8, however, is that at arrow 850, when preventing the positioning of UE 105 from being based on the reference signal transmitted via IRS 425, in some embodiments, location server 160 may configure UE 105 not to generate the measurements, not to transmit the measurements to location server 160, and/or may configure location server 160 itself not to calculate/determine a location/position of UE 105 based on the measurements generated based on the reference signal by transmitting an indication/configuration to UE 105. Accordingly and specifically, in response at least in part to receiving the indication/configuration from location server 160 (e.g., by receiving a flagged reference signal from base station 120 and/or by receiving the separate notification from location server 160 as disclosed above), in block 855, UE 105 may be configured not to generate measurements (e.g., TDOA, AoA, AoD, RSTD, RTT, and/or multi-cell RTT) based on the reference signal and/or not to transmit the measurements generated based on the reference signal to location server 160. Alternatively, in instances where measurements were generated based on the reference signal and were transmitted to location server 160, in block 860, the measurements were transmitted to location server 160 for calculating/determining a location/position of UE 105. In block 865, location server 160 may be configured not to calculate/determine a location/position of UE 105 based on the measurements generated based on the reference signal by receiving the flagged reference signal from base station 120 and/or by generating the separate notification for UE 105 as disclosed above.

Figure 9:
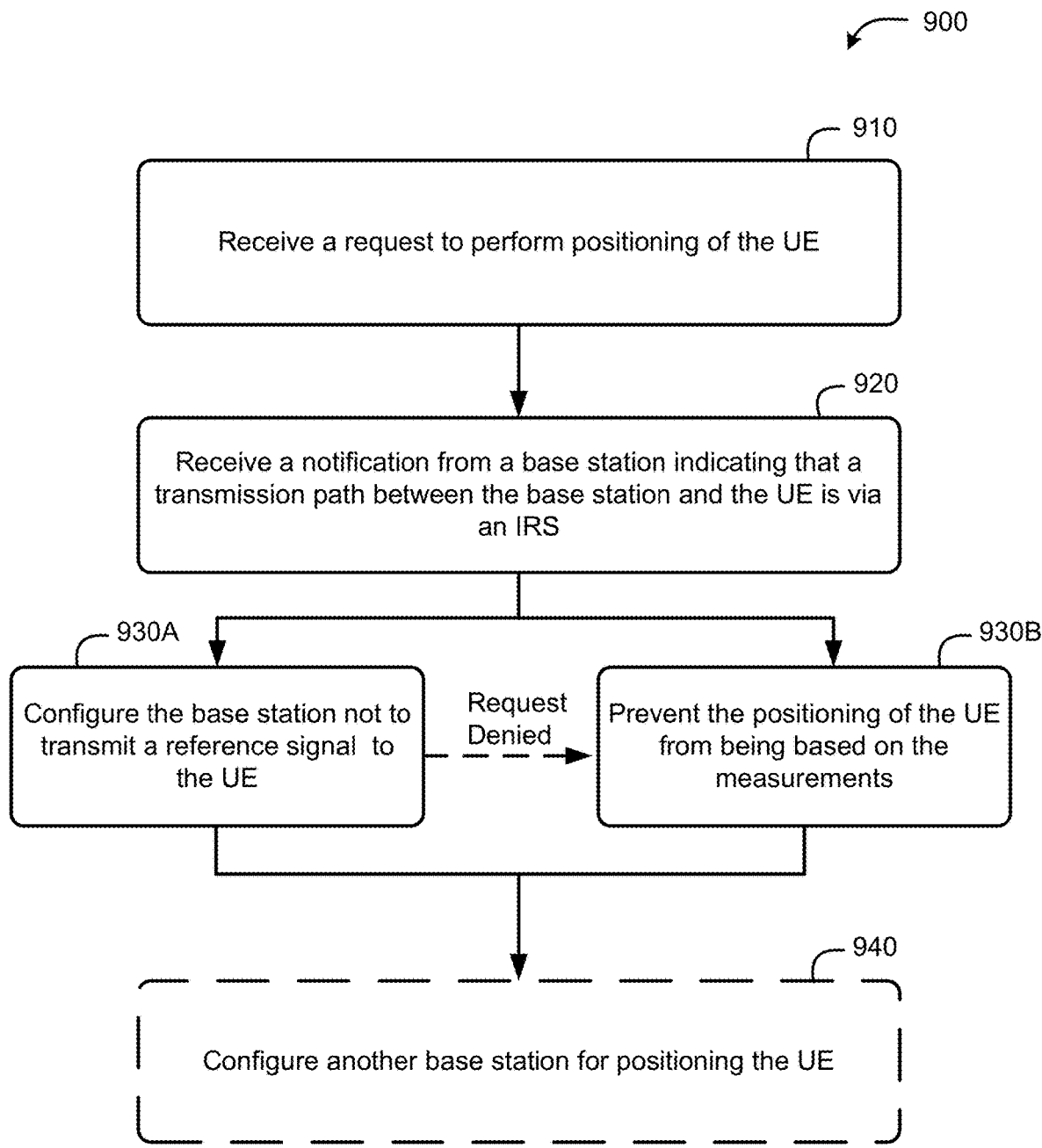
FIG. 9 is a flow diagram of a method of UE positioning performed by a location server in the presence of an IRS, according to an embodiment.
Figure 11:
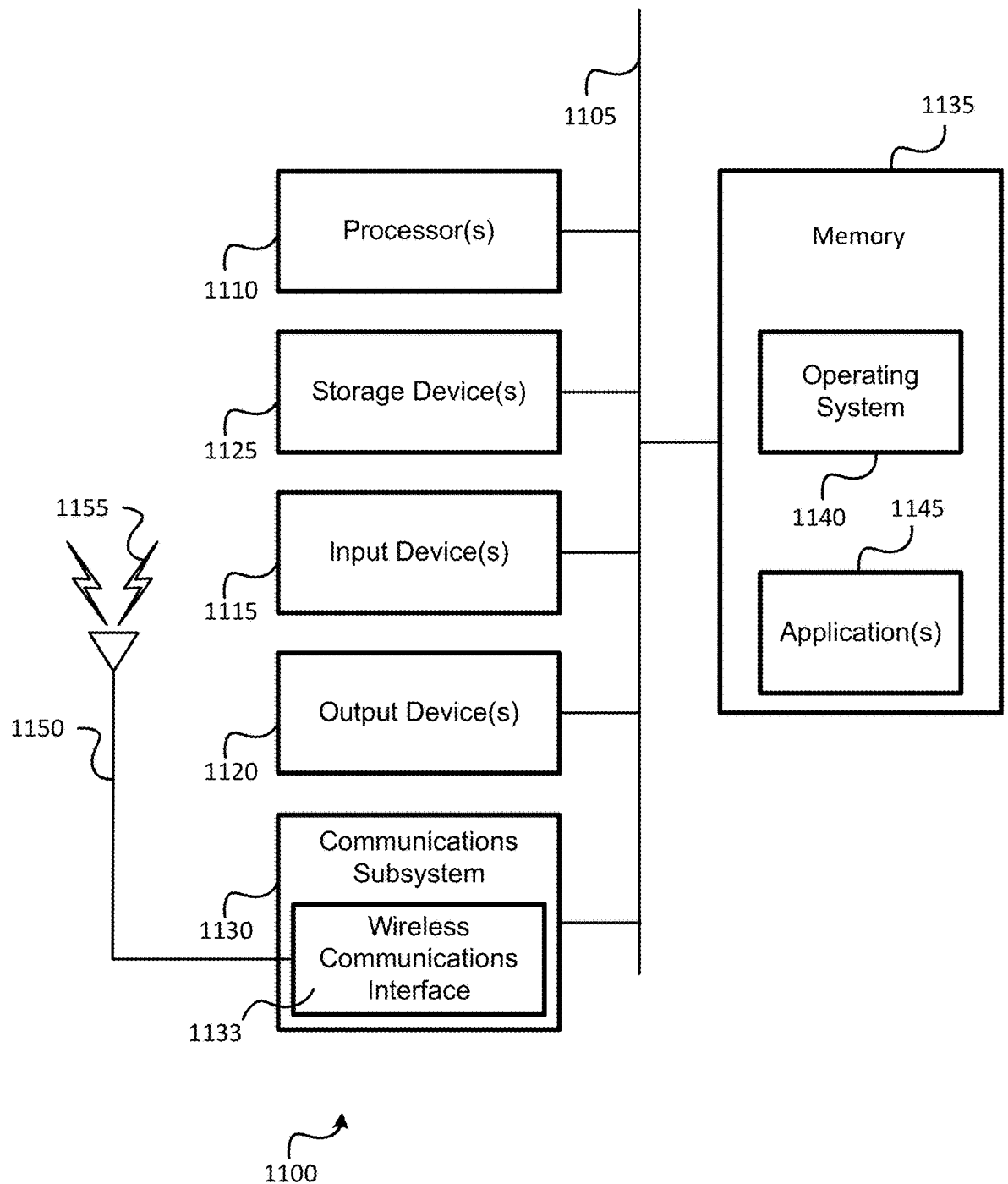
FIG. 11 is a block diagram of an embodiment of a computer system, which can be utilized in embodiments as described herein.

FIG. 9 is a flow diagram of a method 900 of UE positioning performed by a location server in the presence of an IRS, according to an embodiment. Means for performing the functionality illustrated in one or more of the blocks shown in FIG. 9 may be performed by hardware and/or software components of a location server (e.g., location server 160 in FIGS. 1, 4, 7, and 8, and/or LMF 220 in FIG. 2). Example components of the location server are illustrated in FIG. 11, which is described in more detail below.

At block 910, the functionality comprises receiving a request to perform positioning of a UE (e.g., UE 105). Means for performing functionality at block 910 may comprise a wireless communications interface 1133, and/or other components of a location server (e.g., computer system 1100), as illustrated in FIG. 11. Specifically, as noted above, if the positioning is a UE-based process, the positioning may be initiated by the UE. For example, from an application (or app) executed by UE 105. This may be a result from user interaction with UE 105, based on a determined schedule, or based on other triggers (including user input). Alternatively, if the positioning is a UE-assisted process, the positioning may be initiated by an external client (e.g., external client 180 of FIG. 1 and/or external client 230 of FIG. 2). Additionally or alternatively, a positioning request may come from a service within the wireless network that may need the position of UE 105 to provide particular functionality.

At block 920, the functionality comprises receiving a notification from the base station communicating with the UE (e.g., base station 120) indicating that a transmission path between the base station and the UE is via an IRS. Means for performing functionality at block 920 may comprise wireless communications interface 1133, and/or other components of a location server (e.g., computer system 1100), as illustrated in FIG. 11. Specifically, in some embodiments, base station 120 may confirm that the transmission path between base station 120 and UE 105 is via IRS 425 by replying with a notification indicating the same in response to an inquiry made by location server 160. In some other embodiments, base station 120 may directly transmit the notification to location server 160 specifying the presence of IRS 425 in the communication between base station 120 and UE 105 without receiving an inquiry from location server 160.

Responsive, at least in part, to receiving the notification, base station 120 may prevent the positioning of the UE from being based on a reference signal (e.g., a PRS) transmitted through the transmission path between the base station and the UE.

Specifically, in some embodiments, method 900 moves to block 930A. At block 930A, the functionality comprises configuring base station 120 not to transmit the reference signal (e.g., the PRS) to UE 105 by sending a request notification. Means for performing functionality at block 930A may comprise a processor 1110, wireless communications interface 1133, and/or other components of a location server (e.g., computer system 1100), as illustrated in FIG. 11. For example, when scheduling the transmission and receipt of the reference signal by base station 120 and UE 105, location server 160 may configure base station 120 not to transmit the reference signal to UE 105. Alternatively, location server 160 may configure base station 120 to "switch off" IRS for transmitting the reference signal, e.g., by controlling IRS 425 to not to reflect the reference signal towards UE 105 using a control channel.

In some other embodiments, in instances where the request for not to transmit the reference signal to UE 105 is denied or, no such request is made, method 900 moves to block 930B. At block 930B, the functionality comprises preventing the positioning of the UE from being based on the measurements. For example, the operation may include configuring UE 105 not to determine measurements and/or not to calculate/determine a location/position based on the measurements in a UE-based positioning configuration or configuring UE 105 not to determine measurements and/or not to transmit the measurements generated based on the reference signal to location server 160 for calculating/determining a location/position based on the measurements in a UE-assisted positioning configuration. Means for performing functionality at block 930B may comprise a processor 1110, and/or other components of a location server (e.g., computer system 1100), as illustrated in FIG. 11.

Specifically, as noted, location server 160 may flag the reference signal (e.g., in assistance data such as a PRS configuration) transmitted from base station 120 indicating that the reference signal is transmitted via an IRS (e.g., associate a general indicator with the reference signal indicating the transmission of the reference signal is via at least on IRS) and/or a specific IRS (e.g., associate the IRS ID of IRS 425 with the reference signal). In some other embodiments, location server 160 may also indicate the same in a separate notification (e.g., in a separate message in addition to the assistance data) and transmit the notification to UE 105. In response to receiving the configuration (e.g., the flagged reference signal and/or the separate notification), UE 105 may perform the above-mentioned operations, such as not to determine measurements, not to calculate/determine a location/position based on the measurements, and/or not to transmit the measurements generated based on the reference signal to location server 160 for calculating/determining a location/position based on the measurements, or a combination thereof, depending on whether the UE positioning is UE based or UE assisted.

At block 940, the functionality optionally comprises configuring another base station (e.g., a second base station) for positioning UE 105, where a transmission path between the other base station and the UE includes no IRS. Means for performing functionality at block 940 may comprise processor 1110, wireless communications interface 1133, and/or other components of a location server (e.g., computer system 1100), as illustrated in FIG. 11. For example, upon receiving a notification from the other base station indicating that the transmission path between the other base station and UE 105 includes no IRS, location server 160 may schedule the transmission and receipt of the reference signal by the other base station and UE 105 as disclosed above for positioning of UE 105.

Figure 10:
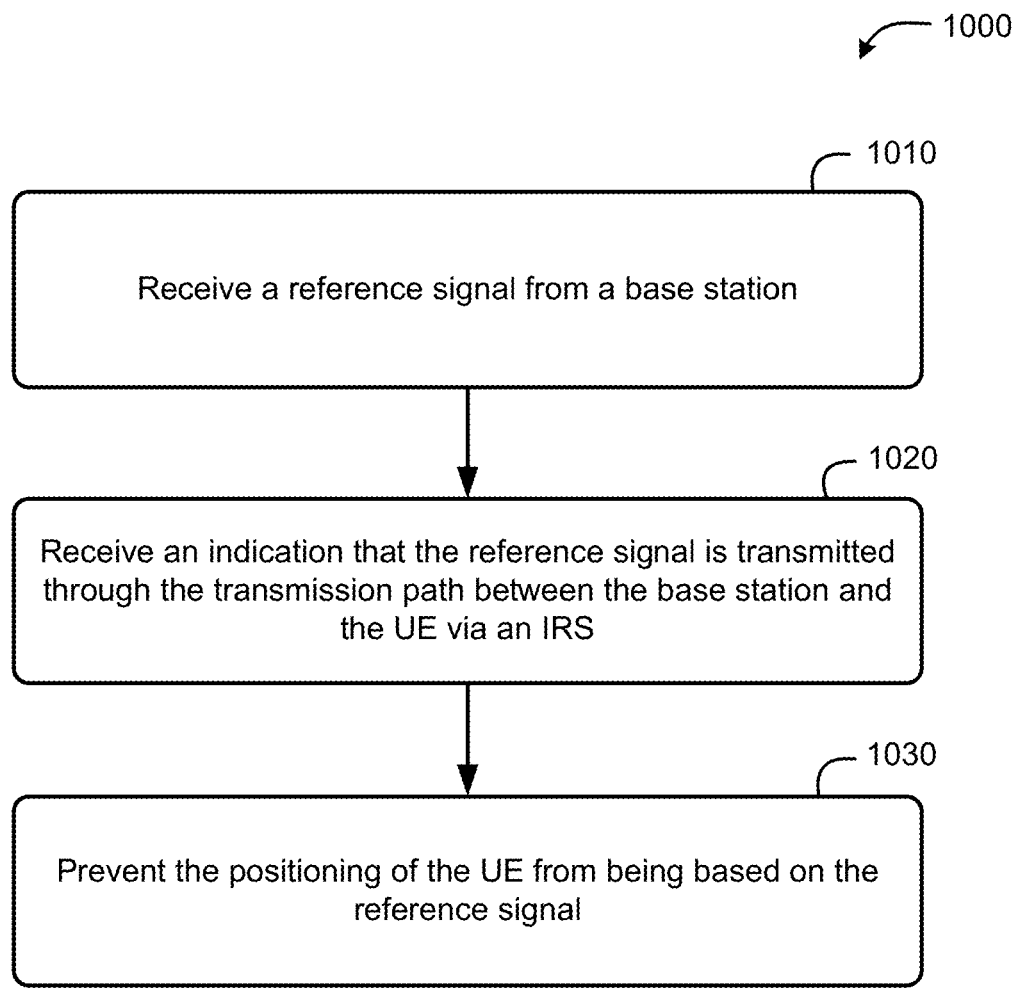
FIG. 10 is a flow diagram of a method of UE positioning performed by a UE in the presence of an IRS, according to an embodiment.
Figure 12:
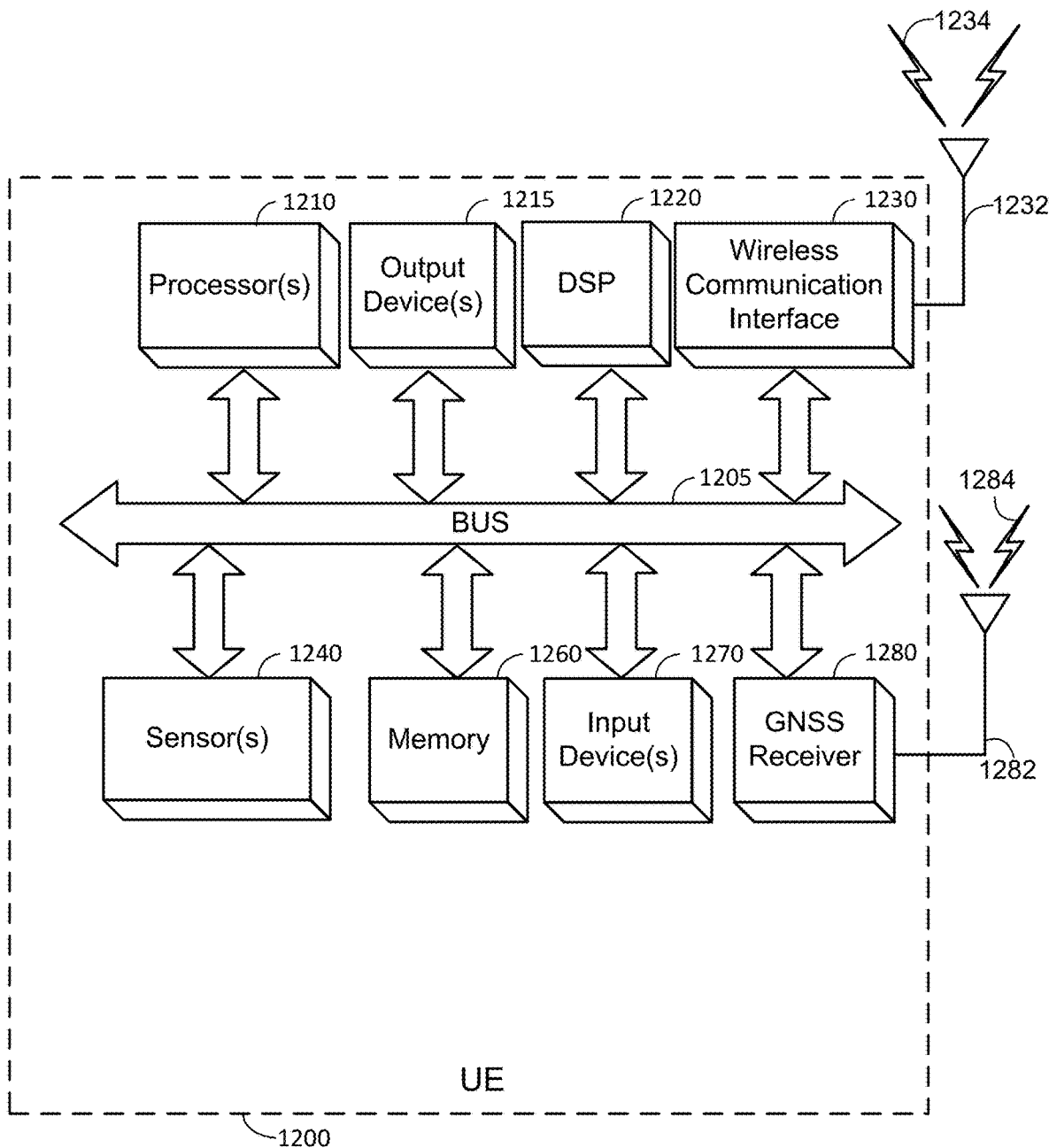
FIG. 12 is a block diagram of an embodiment of a UE, which can be utilized in embodiments as described herein.

FIG. 10 is a flow diagram of a method 1000 of UE positioning performed by the UE in the presence of an IRS, according to an embodiment. Means for performing the functionality illustrated in one or more of the blocks shown in FIG. 12 may be performed by hardware and/or software components of a location server (e.g., UEs 145 in FIG. 1, and UE 105 in FIGS. 2, 3, 4, 7, and 8). Example components of the UE are illustrated in FIG. 12, which is described in more detail below.

At block 1010, the functionality comprises receiving a reference signal (e.g., a PRS) from a base station (base station 120), where a transmission path between the base station and the UE is via an IRS (IRS 425). Means for performing functionality at block 1010 may comprise a wireless communications interface 1230, and/or other components of a UE 1200, as illustrated in FIG. 12. Specifically, as noted above, a location server (e.g., location server 160) may schedule the transmission and receipt of the reference signal by the base station and UE 105.

At block 1020, the functionality comprises receiving an indication that the reference signal is transmitted through the transmission path between the base station and the UE via the IRS. Means for performing functionality at block 1010 may comprise wireless communications interface 1230, and/or other components of a UE 1200, as illustrated in FIG. 12. Specifically, as noted above, upon receiving a notification from base station 120 indicating the presence of the IRS, location server 160 may notify/configure UE 105 by flagging the reference signal transmitted from base station 120 indicating that the reference signal is transmitted via an IRS (e.g., associate a general indicator with the PRS indicating the transmission of the PRS is via at least on IRS) and/or a specific IRS (e.g., associate the IRS ID of IRS 425 with the PRS) or by transmitting in a separate notification indicating the same to UE 105.

At block 1030, the functionality comprises preventing the positioning of the UE from being based on the reference signal. Means for performing functionality at block 1010 may comprise a processor 1210, and/or other components of a UE 1200, as illustrated in FIG. 12. Specifically, as noted above, responsive, at least in part, to receiving the indication, UE 105 may be configured not to determine measurements, not to calculate/determine a location/position based on the measurements, and/or not to transmit the measurements generated based on the reference signal to location server 160 for calculating/determining a location/position based on the measurements, or a combination thereof, depending on whether the UE positioning is a UE-based configuration or UE-assisted configuration.

FIG. 11 is a block diagram of an embodiment of a computer system 1100, which may be used, in whole or in part, to provide the functions of one or more network components as described in the embodiments herein (e.g., location server 160 in FIGS. 1, 4, 7, and 8, and/or LMF 220 in FIG. 2). For example, computer system 1100 can perform one or more of the functions of the method shown in FIG. 8. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different geographical locations.

The computer system 1100 is shown comprising hardware elements that can be electrically coupled via a bus 1105 (or may otherwise be in communication, as appropriate). The hardware elements may include processor(s) 1110, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1100 may also include a communications subsystem 1130, which may comprise wireless communication technologies managed and controlled by a wireless communication interface 1133, as well as wired technologies (such as Ethernet, coaxial communications, universal serial bus (USB), and the like). The wireless communication interface 1133 may comprise one or more wireless transceivers that may send and receive wireless signals 1155 (e.g., signals according to 5G NR or LTE) via wireless antenna(s) 1150. Thus the communications subsystem 1130 may comprise a modem, a network card (wireless or wired), an infrared communication device, a wireless communication device, and/or a chipset, and/or the like, which may enable the computer system 1100 to communicate on any or all of the communication networks described herein to any device on the respective network, including a User Equipment (UE), base stations and/or other TRPs, and/or any other electronic devices described herein. Hence, the communications subsystem 1130 may be used to receive and send data as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer);

in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

FIG. 12 is a block diagram of an embodiment of a UE 105, which can be utilized as described herein above (e.g., in association with e.g., UEs 145 in FIG. 1, and UE 105 in FIGS. 2, 3, 4, 7, and 8). For example, UE 105 can perform one or more of the functions of the method shown in FIG. 9. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 12.

UE 105 is shown comprising hardware elements that can be electrically coupled via a bus 1205 (or may otherwise be in communication, as appropriate). The hardware elements may include a processor(s) 1210 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1210 may comprise one or more processing units, which may be housed in a single integrated circuit (IC) or multiple ICs. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below). UE 105 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

UE 105 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable UE 105 to communicate with other devices as described in the embodiments above. The wireless communication interface 1230 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof. The antenna(s) 1232 may be capable of transmitting and receiving wireless signals using beams (e.g., Tx beams and Rx beams). Beam formation may be performed using digital and/or analog beam formation techniques, with respective digital and/or analog circuitry. The wireless communication interface 1230 may include such circuitry.

Depending on desired functionality, the wireless communication interface 1230 may comprise a separate receiver and transmitter, or any combination of transceivers, transmitters, and/or receivers to communicate with base stations (e.g., ng-eNBs and gNBs) and other terrestrial transceivers, such as wireless devices and access points. UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

UE 105 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of UE 105 may also include a Global Navigation Satellite System (GNSS) receiver 1280 capable of receiving signals 1284 from one or more GNSS satellites using an antenna 1282 (which could be the same as antenna 1232). Positioning based on GNSS signal measurement can be utilized to complement and/or incorporate the techniques described herein. The GNSS receiver 1280 can extract a position of the UE 105, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1210, DSP 1220, and/or a processor within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1210 or DSP 1220.

The UE 105 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of UE 105 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by UE 105 (and/or processor(s) 1210 or DSP 1220 within UE 105). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of positioning a user equipment (UE) by a location server in a wireless communications network, the method comprising: receiving a request to perform positioning of the UE; receiving a notification from a first base station indicating that a transmission path between the first base station and the UE is via an intelligent reflecting surface (IRS); and responsive, at least in part, to receiving the notification, preventing the positioning of the UE from being based on a reference signal transmitted through the transmission path between the first base station and the UE.

Clause 2. The method of clause 1 wherein preventing the positioning of the UE from being based on the reference signal comprises: configuring the UE not to perform positioning based on the reference signal.

Clause 3. The method of clause 1, wherein preventing the positioning of the UE from being based on the reference signal comprises: flagging the reference signal so that the reference signal is not used in the positioning of the UE.

Clause 4. The method of clause 3, wherein the flagged reference signal configures the UE not to generate measurements based on the flagged reference signal.

Clause 5. The method of clause 3, wherein the flagged reference signal configures the UE not to transmit measurements, generated based on the flagged reference signal, to the location server for positioning the UE.

Clause 6. The method of clause 3, wherein preventing the positioning of the UE from being based on the reference signal comprises: preventing determining a position of the UE using measurements generated based on the reference signal.

Clause 7. The method of any of clauses 1-6, further comprising: sending a request to the first base station not to transmit the reference signal through the transmission path between the first base station and the UE, prior to preventing the positioning of the UE from being based on the reference signal.

Clause 8. The method of any of clauses 1-7, wherein sending the request to the first base station not to transmit the reference signal through the transmission path between the first base station and the UE comprises: requesting the first base station to switch off the IRS for transmitting the reference signal.

Clause 9. The method of any of clauses 1-7, wherein preventing the positioning of the UE from being based on the reference signal is responsive, at least in part, to receiving an indication from the first base station that the request not to transmit the reference signal through the transmission path between the first base station and the UE has been denied.

Clause 10. The method of any of clauses 1-7, wherein sending the request to the first base station not to transmit the reference signal through the transmission path between the first base station and the UE comprises sending the request to the first base station based on a Long-Term Evolution (LTE) Positioning Protocol (LPP) or a New Radio (NR) Positioning Protocol annex (NRPPa) Protocol.

Clause 11. The method of any of clauses 1-10 further comprising: configuring a second base station for positioning the UE, wherein a transmission path between the second base station and the UE includes no IRS.

Clause 12. A method of positioning a user equipment (UE) by the UE in a wireless communications network, the method comprising: receiving a reference signal from a first base station, wherein a transmission path between the first base station and the UE is via an intelligent reflecting surface (IRS); receiving an indication indicating the reference signal is transmitted through the transmission path between the first base station and the UE via the IRS; and responsive, at least in part, to receiving the indication, preventing the positioning of the UE from being based on the reference signal.

Clause 13. The method of clause 12 wherein receiving the indication comprises: receiving a configuration from a location server, receiving a notification that the reference signal has been flagged, or a combination thereof.

Clause 14. The method of clause 12, wherein preventing the positioning of the UE from being based on the reference signal transmitted comprises: preventing the UE from: determining a position of the UE based on measurements generated using the reference signal, or transmitting measurements generated using the reference signal to a location server for determining a position of the UE, or a combination thereof.

Clause 15. A device comprising: a transceiver configured to: receive a request to perform positioning of a UE; and receive a notification from a first base station indicating that a transmission path between the first base station and the UE is via an intelligent reflecting surface (IRS); a memory; and one or more processing units communicatively coupled with the transceiver and the memory, the one or more processing units configured to: responsive, at least in part, to receiving the notification, prevent the positioning of the UE from being based on a reference signal transmitted through the transmission path between the first base station and the UE.

Clause 16. The device of clause 15, wherein to prevent the positioning of the UE from being based on the reference signal, the one or more processing units are further configured to: configure the UE not to perform positioning based on the reference signal.

Clause 17. The device of clause 15, wherein to prevent the positioning of the UE from being based on the reference signal, the one or more processing units are further configured to: flag the reference signal so that the reference signal is not used in the positioning of the UE.

Clause 18. The device of clause 15 or 17, wherein the flagged reference signal configures the UE not to generate measurements based on the flagged reference signal.

Clause 19. The method of clause 15 or 17, wherein the flagged reference signal configures the UE not to transmit measurements, generated based on the flagged reference signal, to the location server for positioning the UE.

Clause 20. The device of clause 15 or 17, wherein to prevent the positioning of the UE from being based on the reference signal, the one or more processing units are further configured to: prevent determining a position of the UE using measurements generated based on the reference signal.

Clause 21. The device of any of clauses 15-20, wherein the transceiver is further configured to: send a request to the first base station not to transmit the reference signal through the transmission path between the first base station and the UE, prior to preventing the positioning of the UE from being based on the reference signal.

Clause 22. The device of any of clauses 15-21, wherein the one or more processing units are further configured to: request the first base station to switch off the IRS for transmitting the reference signal.

Clause 23. The device of any of clauses 15-21, wherein to prevent the positioning of the UE from being based on the reference signal is responsive, at least in part, to receiving an indication from the first base station that the request not to transmit the reference signal through the transmission path between the first base station and the UE has been denied.

Clause 24. The device of any of clauses 15-21, wherein the request sent to the first base station is based on a Long-Term Evolution (LTE) Positioning Protocol (LPP) or a New Radio (NR) Positioning Protocol annex (NRPPa) Protocol.

Clause 25. The device of any of clauses 15-21, wherein the one or more processing units are further configured to: configuring a second base station for positioning the UE, wherein a transmission path between the second base station and the UE includes no IRS.

Clause 26. A user equipment comprising: a wireless communication interface configured to: receive a reference signal from a first base station, wherein a transmission path between the first base station and the UE is via an intelligent reflecting surface (IRS); and receive an indication indicating the reference signal is transmitted through the transmission path between the first base station and the UE via the IRS; a memory; and one or more processing units communicatively coupled to the wireless communication interface and the memory, the one or more processing units configured to: responsive, at least in part, to receive the notification, prevent the positioning of the UE from being based on the reference signal transmitted through the transmission path between the first base station and the UE.

Clause 27. The user equipment of clause 26 wherein to receive the indication the wireless communication interface is further configured to: receive a configuration from a location server, receive a notification that the reference signal has been flagged, or a combination thereof.

Clause 28. The user equipment of clause 26, wherein to prevent the positioning of the UE from being based on the reference signal transmitted, the one or more processing units are further configured to: prevent the UE from determining a position of the UE based on measurements generated using the reference signal or prevent the UE from transmitting measurements generated using the reference signal to a location server for determining a position of the UE, or a combination thereof.

What is claimed is:

1. A method of positioning a user equipment (UE) by a location server in a wireless communications network, the method comprising:
   receiving a request to perform positioning of the UE;
   receiving a notification from a first base station indicating that a first transmission path between the first base station and the UE is via an intelligent reflecting surface (IRS); and
   responsive, at least in part, to receiving the notification, configuring a second base station for positioning the UE, wherein a second transmission path between the second base station and the UE includes no IRS, and preventing the positioning of the UE from being based on a reference signal transmitted through the first transmission path between the first base station and the UE.

2. The method of claim 1 wherein preventing the positioning of the UE from being based on the reference signal comprises: configuring the UE not to perform positioning based on the reference signal.

3. The method of claim 1, wherein preventing the positioning of the UE from being based on the reference signal comprises:
   flagging the reference signal so that the reference signal is not used in the positioning of the UE.

4. The method of claim 3, wherein the flagged reference signal configures the UE not to generate measurements based on the flagged reference signal.

5. The method of claim 3, wherein the flagged reference signal configures the UE not to transmit measurements, generated based on the flagged reference signal, to the location server for positioning the UE.

6. The method of claim 3, wherein preventing the positioning of the UE from being based on the reference signal comprises:
   preventing determining a position of the UE using measurements generated based on the reference signal.

7. The method of claim 1, further comprising: sending a request to the first base station not to transmit the reference signal through the first transmission path between the first base station and the UE, prior to preventing the positioning of the UE from being based on the reference signal.

8. The method of claim 7, wherein sending the request to the first base station not to transmit the reference signal through the first transmission path between the first base station and the UE comprises:
   requesting the first base station to switch off the IRS for transmitting the reference signal.

9. The method of claim 7, wherein preventing the positioning of the UE from being based on the reference signal is responsive, at least in part, to receiving an indication from the first base station that the request not to transmit the reference signal through the first transmission path between the first base station and the UE has been denied.

10. The method of claim 7, wherein sending the request to the first base station not to transmit the reference signal through the first transmission path between the first base station and the UE comprises sending the request to the first base station based on a Long-Term Evolution (LTE) Positioning Protocol (LPP) or a New Radio (NR) Positioning Protocol annex (NRPPa) Protocol.

11. A method of positioning a user equipment (UE) by the UE in a wireless communications network, the method comprising:
  receiving a reference signal from a first base station, wherein a first transmission path between the first base station and the UE is via an intelligent reflecting surface (IRS);
  receiving an indication indicating the reference signal is transmitted through the first transmission path between the first base station and the UE via the IRS; and
  responsive, at least in part, to receiving the indication, configuring a second base station for positioning the UE, wherein a second transmission path between the second base station and the UE includes no IRS, and preventing the positioning of the UE from being based on the reference signal.

12. The method of claim 11 wherein receiving the indication comprises: receiving a configuration from a location server, receiving a notification that the reference signal has been flagged, or a combination thereof.

13. The method of claim 11, wherein preventing the positioning of the UE from being based on the reference signal transmitted comprises: preventing the UE from:
  determining a position of the UE based on measurements generated using the reference signal, or
  transmitting measurements generated using the reference signal to a location server for determining a position of the UE, or
  a combination thereof.

14. A device comprising:
  a transceiver configured to:
    receive a request to perform positioning of a user equipment (UE); and
    receive a notification from a first base station indicating that a first transmission path between the first base station and the UE is via an intelligent reflecting surface (IRS);
  a memory; and
  one or more processing units communicatively coupled with the transceiver and the memory, the one or more processing units configured to:
    responsive, at least in part, to receiving the notification, configure a second base station for positioning the UE, wherein a second transmission path between the second base station and the UE includes no IRS, and prevent the positioning of the UE from being based on a reference signal transmitted through the first transmission path between the first base station and the UE.

15. The device of claim 14, wherein to prevent the positioning of the UE from being based on the reference signal, the one or more processing units are further configured to:
  configure the UE not to perform positioning based on the reference signal.

16. The device of claim 14, wherein to prevent the positioning of the UE from being based on the reference signal, the one or more processing units are further configured to:
  flag the reference signal so that the reference signal is not used in the positioning of the UE.

17. The device of claim 16, wherein the flagged reference signal configures the UE not to generate measurements based on the flagged reference signal.

18. The device of claim 16, wherein the flagged reference signal configures the UE not to transmit measurements, generated based on the flagged reference signal, to a location server for positioning the UE.

19. The device of claim 16, wherein to prevent the positioning of the UE from being based on the reference signal, the one or more processing units are further configured to:
  prevent determining a position of the UE using measurements generated based on the reference signal.

20. The device of claim 14, wherein the transceiver is further configured to:
  send a request to the first base station not to transmit the reference signal through the first transmission path between the first base station and the UE, prior to preventing the positioning of the UE from being based on the reference signal.

21. The device of claim 20, wherein the one or more processing units are further configured to:
  request the first base station to switch off the IRS for transmitting the reference signal.

22. The device of claim 20, wherein to prevent the positioning of the UE from being based on the reference signal is responsive, at least in part, to receiving an indication from the first base station that the request not to transmit the reference signal through the first transmission path between the first base station and the UE has been denied.

23. The device of claim 20, wherein the request sent to the first base station is based on a Long-Term Evolution (LTE) Positioning Protocol (LPP) or a New Radio (NR) Positioning Protocol annex (NRPPa) Protocol.

24. A user equipment (UE) comprising:
  a wireless communication interface configured to:
    receive a reference signal from a first base station, wherein a first transmission path between the first base station and the UE is via an intelligent reflecting surface (IRS); and
    receive an indication indicating the reference signal is transmitted through the first transmission path between the first base station and the UE via the IRS;
  a memory; and
  one or more processing units communicatively coupled to the wireless communication interface and the memory, the one or more processing units configured to:
    responsive, at least in part, to receiving the indication, configure a second base station for positioning the UE, wherein a second transmission path between the second base station and the UE includes no IRS, and prevent positioning of the UE from being based on the reference signal transmitted through the first transmission path between the first base station and the UE.

25. The user equipment of claim 24 wherein to receive the indication the wireless communication interface is further configured to:
  receive a configuration from a location server, receive a notification that the reference signal has been flagged, or a combination thereof.

26. The user equipment of claim 24, wherein to prevent positioning of the UE from being based on the reference signal transmitted, the one or more processing units are further configured to:
  prevent the UE from determining a position of the UE based on measurements generated using the reference signal, or prevent the UE from transmitting measurements generated using the reference signal to a location server for determining a position of the UE, or a combination thereof.

* * * * *